United States Patent [19]

Horiguchi

[11] Patent Number: 5,765,117
[45] Date of Patent: Jun. 9, 1998

[54] METHOD AND APPARATUS FOR CONTROLLING THE SPEED CHANGE OF A VEHICLE AUTOMATIC TRANSMISSION

[75] Inventor: Masanobu Horiguchi, Kanagawa-ken, Japan

[73] Assignee: Unisia Jecs Corporation, Kanagawa-ken, Japan

[21] Appl. No.: 554,506

[22] Filed: Nov. 7, 1995

[51] Int. Cl.$^6$ .............................. G06G 7/70; F16H 59/48
[52] U.S. Cl. ..................... 701/51; 701/95; 701/65; 411/120; 411/121
[58] Field of Search .................. 364/424.08, 424.083, 364/424.089, 424.086, 424.094, 431.07, 426.043, 431.04, 426.01; 477/120, 121, 901, 68, 43, 107, 129; 180/197, 170, 179; 701/51, 55, 65, 66, 94, 70, 93

[56] References Cited

U.S. PATENT DOCUMENTS

| | | | |
|---|---|---|---|
| 4,338,666 | 7/1982 | Suzuki et al. | 364/424.085 |
| 4,393,732 | 7/1983 | Suzuki et al. | 364/424.091 |
| 4,870,584 | 9/1989 | Etoh et al. | 364/426.043 |
| 5,040,114 | 8/1991 | Ishikawa et al. | 364/424.083 |
| 5,048,631 | 9/1991 | Etoh | 364/426.042 |
| 5,101,689 | 4/1992 | Yamaguchi et al. | 364/424.083 |
| 5,121,657 | 6/1992 | Asada | 477/120 |
| 5,231,582 | 7/1993 | Takahashi et al. | 364/426.044 |
| 5,231,897 | 8/1993 | Morita | 364/424.094 |
| 5,411,449 | 5/1995 | Takahashi et al. | 477/120 |
| 5,484,350 | 1/1996 | Ishikawa et al. | 477/97 |
| 5,531,654 | 7/1996 | Ishikawa et al. | 477/120 |
| 5,558,596 | 9/1996 | Adachi et al. | 364/424.086 |
| 5,598,336 | 1/1997 | Kume et al. | 364/424.08 |

FOREIGN PATENT DOCUMENTS 4-4351   1/1992   Japan.

*Primary Examiner*—Jacques H. Louis-Jacques
*Attorney, Agent, or Firm*—McDermott, Will & Emery

[57] ABSTRACT

A down-shift acceleration resistance and a down-shift target acceleration are compared, and only when a deceleration intent by the driver is detected, is a down-shift to a gear ratio which is one step higher than a gear ratio which will produce deceleration in excess of that indicated necessary by the comparison, permitted. In the absence of any detected deceleration intent by the driver, a forcible downshifting is inhibited. The shifting is controlled through computation which does not rely on large amounts of prestored table data.

15 Claims, 19 Drawing Sheets

R/L TABLE

Tt MAP

TRA TABLE

METHOD AND APPARATUS FOR CONTROLLING THE SPEED CHANGE OF A VEHICLE AUTOMATIC TRANSMISSION

BACKGROUND OF THE INVENTION

1. Field of the Invention

The present invention relates to a method and apparatus for controlling the speed change of a vehicle automatic transmission, and in particular to improved technology related to speed change control at the time of deceleration.

2. Description of the Related Art

In general with a vehicle automatic transmission, speed change is carried out automatically based on a speed change pattern previously set in accordance with vehicle running conditions.

More specifically, a speed change pattern for setting speed change steps in accordance with vehicle speed and engine load (for example throttle valve opening), is stored in a storage device in the control section, and speed change is controlled according to this speed change pattern. Normally under small speed change pattern is set such that if the vehicle speed is the same, there is a tendency to shift up, the smaller engine load.

However, with such a conventional automatic speed change control, since for example, at the time of descent there is an up shift contrary to the deceleration requirements of the driver who fully closes the throttle, then a different or disconcerting sensation inconsistent with the deceleration requirements of the driver is experienced. Moreover, the deceleration effect from engine braking is not realized. The driveability of the vehicle is thus impaired, and excessive loading is applied to the brakes.

In order to solve this problem at the time of descent, there has been proposed, for example as disclosed in Japanese Unexamined Patent Publication No. 4-4351, a speed change device wherein the speed change is controlled to an optimum speed change step so as to obtain a desired acceleration at the time of descent, by computing the engine generated torque based on the throttle valve opening and the engine rotational speed, then computing the vehicle running resistance based on the computed generated torque, the vehicle acceleration, and the vehicle weight, and comparing the vehicle running resistance with set values set beforehand in accordance with the speed change steps.

With this device however, the speed change is controlled to obtain a desired acceleration at the time of descent based on vehicle conditions only, irrespective of the deceleration intention of the driver. This results in a different or disconcerting sensation being experienced by the driver. Moreover, a map (see FIG. 20) is required wherein the speed change timing is set in accordance with the speed change steps, thus necessitating a large memory for storing the map.

SUMMARY OF THE INVENTION

In view of the abovementioned problems with the conventional technology, it is an object of the present invention to provide a method and apparatus for controlling the speed change of a vehicle automatic transmission, which can optimize speed change control at the time of deceleration (for example at the time of descent), to suppress the different sensation experienced by the driver and improve vehicle drivability, while at the same time reducing computer memory capacity and hence cost. Moreover, it is an object of the present invention to significantly increase the accuracy and simplify the construction of such a control method and apparatus.

To achieve the above object, a method and apparatus according to a first aspect of the present invention for controlling the speed change of a vehicle automatic transmission wherein the vehicle automatic transmission is connected to an engine output shaft, comprises;

- a vehicle speed detection step or device for detecting vehicle speed,
- a vehicle running resistance detection step or device for detecting vehicle running resistance,
- an engine load detection step or device for detecting engine load,
- a deceleration intention detection step or device for detecting a deceleration intention of a driver based on the engine load,
- a first vehicle acceleration estimation step or device for estimating vehicle acceleration in the case of a speed change to a speed change step on a lower speed side of a current speed change step, based on the vehicle speed and vehicle running resistance,
- a target acceleration setting step or device for setting a target acceleration,
- a first acceleration comparison step or device for comparing the vehicle acceleration estimated by the first vehicle acceleration estimation step or device, with the target acceleration set by the target acceleration setting step or device, and
- a first speed change control step or device for controlling speed change by selecting (speed change control), at the time of detecting a deceleration intention of the driver by the deceleration intention detection step or device, a speed change step to give a vehicle acceleration after speed change equal to or above the target acceleration, based on the comparison results of the first acceleration comparison step or device.

With the present invention incorporating such a construction, the vehicle acceleration for the case of downshift from the current speed change step is estimated by the first vehicle acceleration estimation step or device, and the estimated vehicle acceleration compared with a target acceleration to select a speed change step to give a vehicle acceleration after speed change equal to or above the target value (that is to say so that there is no excessive deceleration). On the other hand, the deceleration intention of the driver is determined, and in the case of no deceleration intention, the speed change control by the first speed change control step or device for the down slope is prohibited in order to respect the will of the driver and avoid giving a different sensation, and speed change control is carried out according to the normal speed change pattern. Speed change to the speed change step selected by the first speed change control step or device is thus limited to the case where there is driver deceleration intention.

As a result, down slope speed change control which respects the deceleration intention of the driver can be carried out, and speed change can be to a speed change step for an acceleration which does not give excessive deceleration (for example a value close to and above 0). It is thus possible to obtain good deceleration characteristics corresponding to the gradient without the driver experiencing a different sensation of an excessive engine braking effect. Hence vehicle driveability on a down slope can be optimized.

The selection of a speed change step to give a vehicle acceleration after speed change equal to or above a target value so that the driver does not experience a different sensation of an excessive engine braking effect, is a very important point. More specifically, if the driver experiences even a slight excess deceleration, since the driver has no effective means to avoid this different sensation, it cannot be easily overcome. However, if a speed change step is selected to give a vehicle acceleration after speed change equal to or above the target value, then for example even if the driver experiences this as a different sensation, since this will be one of excess acceleration, it can very easily overcome by applying the brake.

Moreover, by comparing the vehicle acceleration estimated by computation, with the target acceleration, to thereby select the speed change step, then a map requiring a large memory, as with the conventional arrangement (see FIG. 20) wherein the speed change timing is set in accordance with the speed change steps, is not required. Hence costs can be reduced.

The first vehicle acceleration estimation step or device may be constructed such that the vehicle acceleration is estimated when the throttle valve is fully closed.

More specifically, at the time of descent, the driver desires to travel at with the throttle valve fully closed a constant predetermined acceleration (for example approximately 0). Therefore to correspond to this situation, estimation of the vehicle acceleration by the first vehicle acceleration estimation step or device is carried out with the throttle valve fully closed, to thus enable down slope travelling under conditions wherein the driver does not experience a different sensation. In this way, the requirements of the driver can be met.

The first speed change control step or device may be constructed to control speed change by selecting a speed change step on the lowest speed side of the speed change steps which give a vehicle acceleration after speed change equal to or above the target acceleration.

More specifically, the first speed change control step or device controls speed change by selecting the speed change step on the lowest speed side of the speed change steps which gives the vehicle acceleration estimated by the first vehicle acceleration estimation step or device equal to or above the target acceleration. In this way, a maximum engine braking effect can be applied within a range which is not felt as excessive by the driver.

The construction may be such that at the time of brake operation by the driver, speed change control by the first speed change control step or device is not carried out.

More specifically, since vehicle running resistance detection accuracy is reduced when the driver operates the brake, then good final speed change control is lost. Therefore in the case of brake operation, speed change control by the first speed change control step or device is prohibited to avoid this undesirable situation.

Furthermore, the construction may be such that at the time of brake operation, the vehicle running resistance detected by the vehicle running resistance detection step or device, or the target acceleration set by the target acceleration setting step or device, is corrected.

That is to say, when the driver operates the brake, the vehicle running resistance detected by the vehicle running resistance detection step or device, or the target acceleration set by the target acceleration setting step or device is corrected, so that the speed change control accuracy even with brake operation can be improved. In this way, down slope speed change control can be carried out with a more highly accurate first speed change control step or device.

The invention as described above is arranged with speed change to the down-shift side to enable travelling at a desired acceleration at the time of descent. However an arrangement is also possible as with the invention described below, with speed change to the up-shift side to enable travelling at a desired acceleration at the time of descent. That is to say, to deal with the situation when the down slope gradient is gentle, or when the current speed change step is on the low side, and the driver will experience a different sensation of excess deceleration if up-shift is not carried out.

In this case, a method and apparatus according to a second aspect of the present invention for controlling the speed change of a vehicle automatic transmission which is connected to an engine output shaft comprises;

a vehicle speed detection step or device for detecting vehicle speed, an engine load detection step or device for detecting engine load, a deceleration intention detection step or device for detecting a deceleration intention of a driver based on the engine load, a vehicle acceleration detection step or device for detecting vehicle acceleration, a target acceleration setting step or device for setting a target acceleration, a second acceleration comparison step or device for comparing the vehicle acceleration detected by the vehicle acceleration detection step or device, with the target acceleration set by the target acceleration setting step or device, and a second speed change control step or device for controlling speed change from a current speed change step to a speed change step on the higher side, when a deceleration intention of the driver is detected by the deceleration intention detection step or device, and the comparison results of the second acceleration comparison step or device, give the vehicle acceleration detected by the vehicle acceleration detection step or device as less than the target acceleration.

With such a construction, the current vehicle acceleration and the target acceleration are compared, and when in the current speed change step the deceleration is excessive so that the driver experiences a different sensation, a down slope speed change control is carried out by means of the second speed change control step or device, to shift up to a speed change step on a higher side than the current speed change control step. The deceleration intention of the driver however is determined, and in the case of no deceleration intention, the speed change control by the second speed change step or device for the down slope is prohibited in order to respect the will of the driver and avoid giving a different sensation, and speed change control is carried out according to the normal speed change pattern. Up-shift control by the second speed change control step or device is thus limited to the case where there is driver deceleration intention.

As a result, down slope speed change control which respects the deceleration intention of the driver is carried out, with up-shift to a speed change step for an acceleration which does not give excessive deceleration. It is thus possible to obtain good deceleration characteristics corresponding to the gradient without subjecting the driver to a different sensation such as an excessive engine braking effect. Hence vehicle drivability on a down slope can be optimised. As with the beforementioned invention, the selection of a speed change step to give a vehicle acceleration after speed change equal to or above a target value so that the driver does not experience a different sensation such as an excessive engine braking effect, is a very important point.

Moreover, since up-shift is made by comparing the detected vehicle acceleration with the target acceleration, then construction can be simplified, and a map requiring a large memory, as with the conventional arrangement (see FIG. 20) wherein the speed change timing is set in accordance with the speed change steps, is not required. Hence costs can be reduced.

The construction may be such that at the time of brake operation, speed change control by the second speed change control step or device is not carried out.

More specifically, since vehicle acceleration detection accuracy is reduced when the driver presses the brake, then good final speed change control is lost. Therefore in the case of brake operation, speed change control by the second speed change control step or device is prohibited to avoid this undesirable situation.

Furthermore, the construction may be such that at the time of brake operation, the vehicle acceleration detected by the vehicle acceleration detection step or device, or the target acceleration set by the target acceleration setting step or device, is corrected.

That is to say, when the driver operates the brake, the vehicle acceleration detected by the vehicle acceleration detection step or device, or the target acceleration set by the target acceleration setting step or device is corrected, so that the control accuracy even with brake operation can be improved. In this way, down slope speed change control can be carried out with a more highly accurate second speed change control step or device.

In the case where speed change is to the up-shift side to enable travelling at a desired acceleration at the time of descent, an even greater accuracy is possible with the following construction.

That is to say, a method and apparatus according to a third aspect of the present invention for controlling the speed change of a vehicle automatic transmission which is connected to an engine output shaft comprises;

a vehicle speed detection step or device for detecting vehicle speed, a vehicle running resistance detection step or device for detecting vehicle running resistance, an engine load detection step or device for detecting engine load, a deceleration intention detection step or device for detecting a deceleration intention of a driver based on the engine load, a second vehicle acceleration estimation step or device for estimating vehicle acceleration in the case of travelling in a speed change step on the high speed side including the current speed change step, based on the vehicle speed and vehicle running resistance, a target acceleration setting step or device for setting a target acceleration, a third acceleration comparison step or device for comparing the vehicle acceleration estimated by the second vehicle acceleration estimation step or device, with the target acceleration, and a third speed change control step or device for controlling speed change by selecting, at the time of detecting a deceleration intention of the driver by the deceleration intention detection step or device, a speed change step to give a vehicle acceleration estimated by the second vehicle acceleration estimation step or device equal to or above the target acceleration, based on the comparison results of the third acceleration comparison step or device.

With such a construction, the vehicle acceleration for the case of an up-shift (also including the case wherein the current speed change step is maintained), estimated by the second acceleration estimation step or device is compared with the target acceleration to select a speed change step to give a vehicle acceleration after speed change equal to or above the target value (that is to say so that there is no excessive deceleration). On the other hand, the deceleration intention of the driver is determined, and in the case of no deceleration intention, the speed change control by the third speed change step or device for the down slope is prohibited in order to respect the will of the driver and avoid giving a different sensation, and speed change control is carried out according to the normal speed change pattern. Speed change to the speed change step selected by the third speed change control step or device is thus limited to the case where there is driver deceleration intention.

As a result, down slope speed change control which respects the deceleration intention of the driver can be carried out, and speed change can be to a speed change step for an acceleration which does not give excessive deceleration (for example a value close to and above 0). It is thus possible to obtain good deceleration characteristics corresponding to the gradient without subjecting the driver to a different sensation such as an excessive engine braking effect. Hence vehicle drivability on a down slope can be optimised. The selection of a speed change step to give a vehicle acceleration after speed change equal to or above a target value so that the driver does not experience a different sensation such as an excessive engine braking effect, is a very important point.

Moreover, by comparing the vehicle acceleration estimated by computation, with the target acceleration, to thereby select the speed change step, then a map requiring a large memory, as with the conventional arrangement (see FIG. 20) wherein the speed change timing is set in accordance with the speed change steps, is not required. Hence costs can be reduced.

The second vehicle acceleration estimation step or device may be constructed such that the vehicle acceleration is estimated when the throttle valve is fully closed.

More specifically, since at the time of descent, the driver desires to travel with the throttle valve fully closed at a constant predetermined acceleration (for example approximately 0), then down slope travelling must be under conditions wherein the driver does not experience a different sensation. Estimation of the vehicle acceleration by the second vehicle acceleration estimation step or device is therefore carried out with the throttle valve fully closed. In this way, the requirements of the driver can be met.

The third speed change control step or device may be constructed to control speed change by selecting a speed change step on the lowest speed side of the speed change steps which gives a vehicle acceleration estimated by the second speed change estimation step or device equal to or above the target acceleration. In this way, a maximum engine braking effect can be applied within a range which is not felt as excessive by the driver.

The construction may be such that at the time of brake operation, speed change control by the third speed change control step or device is not carried out.

More specifically, since vehicle running resistance detection accuracy is reduced when the driver operates the brake, then good final speed change control is lost. Therefore in the case of brake operation, speed change control by the third speed change control step or device is prohibited to avoid this undesirable situation.

Furthermore, the construction may be such that at the time of brake operation, the vehicle running resistance detected by the vehicle running resistance detection step or device, or the target acceleration set by the target acceleration setting step or device, is corrected.

That is to say, when the driver operates the brake, the vehicle running resistance detected by the vehicle running resistance detection step or device, or the target acceleration set by the target acceleration setting step or device is corrected, so that the control accuracy even with brake operation can be improved. In this way, down slope speed change control can be carried out with a more highly accurate third speed change control step or device.

Moreover, the construction may be such that the abovementioned deceleration intention detection step or device detects a situation wherein the engine load is equal to or below a predetermined value, as a deceleration intention of the driver.

That is to say, the operation or condition which can be most quickly detected to reveal the deceleration intention of the driver is the resultant engine load (related for example to the throttle valve opening, amount of accelerator pedal operation, intake air quantity, fuel supply quantity and the like). Hence by detecting the resultant engine load, the deceleration intention of the driver can be most quickly and accurately detected. The down slope speed change control response and accuracy of the first, second, and third speed change control steps or devices can thus be improved.

The construction may be such that the abovementioned target acceleration detection step or device computes a target acceleration based on vehicle conditions.

With this construction wherein the target acceleration is computed based on vehicle conditions, then the target acceleration can be set to a high accuracy corresponding to the vehicle conditions. Hence speed change control for a down slope can be to an even higher accuracy.

The vehicle conditions may include at least one of vehicle speed, vehicle running resistance, and current speed change step. In this way, the target acceleration is set as a parameter which has a large influence on the actual vehicle acceleration. Hence, highly accurate speed change control for a down slope is possible.

Moreover, to cope with the situation wherein the down slope gradient changes along the down slope, then the control for speed change to the down-shift side and the control for speed change to the up-shift side can be combined together to give travelling at the desired acceleration at the time of a down slope.

That is to say, the method and apparatus for controlling the speed change of a vehicle automatic transmission which is connected to an engine output shaft may comprise;
- a vehicle speed detection step or device for detecting vehicle speed,
- a vehicle running resistance detection step or device for detecting vehicle running resistance,
- an engine load detection step or device for detecting engine load,
- a deceleration intention detection step or device for detecting a deceleration intention of a driver based on the engine load,
- a first vehicle acceleration estimation step or device for estimating vehicle acceleration in the case of a speed change to a speed change step on a lower speed side of a current speed change step, based on the vehicle speed and vehicle running resistance,
- a target acceleration setting step or device for setting a target acceleration,
- a first acceleration comparison step or device for comparing the vehicle acceleration estimated by the first vehicle acceleration estimation step or device, with the target acceleration set by the target acceleration setting step or device,
- a first speed change control step or device for controlling speed change by selecting, at the time of detecting a deceleration intention of the driver by the deceleration intention detection step or device, a speed change step to give a vehicle acceleration after speed change equal to or above the target acceleration, based on the comparison results of the first acceleration comparison step or device,
- a vehicle acceleration detection step or device for detecting vehicle acceleration,
- a second target acceleration setting step or device for setting a second target acceleration,
- a second acceleration comparison step or device for comparing the vehicle acceleration detected by the vehicle acceleration detection step or device, with the second target acceleration set by the second target acceleration setting step or device, and
- a second speed change control step or device for controlling speed change from a current speed change step to a speed change step on the higher side, when a deceleration intention of the driver is detected by the deceleration intention detection step or device, and the comparison results of the second acceleration comparison step or device, give the vehicle acceleration detected by the vehicle acceleration detection step or device as less than the second target acceleration.

In this way, even if the down slope gradient changes during down slope speed change control, down-shift control and up-shift control can be carried out to correspond to the gradient change. Therefore good down slope control can be continuously carried out without the driver experiencing any excessive deceleration.

Moreover, in the case of combining together the control for speed change to the down-shift side and the control for speed change to the up-shift side to give travelling at the desired acceleration at the time of a down slope, then the following construction is possible to give an even higher accuracy control.

That is to say, the method and apparatus for controlling the speed change of a vehicle automatic transmission which is connected to an engine output shaft may comprise;
- a vehicle speed detection step or device for detecting vehicle speed,
- a vehicle running resistance detection step or device for detecting vehicle running resistance,
- an engine load detection step or device for detecting engine load,
- a deceleration intention detection step or device for detecting a deceleration intention of a driver based on the engine load,
- a vehicle acceleration estimation step or device (a combination of the first vehicle acceleration estimation step or device and the second vehicle acceleration estimation step or device) for estimating the current speed change step and vehicle acceleration in the case of speed change, based on the vehicle speed and vehicle running resistance,
- a target acceleration setting step or device for setting a target acceleration,
- a fourth acceleration comparison step or device for comparing the vehicle acceleration estimated by the vehicle acceleration estimation step or device, with the target acceleration set by the target acceleration setting step or device, and a fourth speed change control step or device for controlling speed change by selecting, at the time of detecting a deceleration intention of the driver by the deceleration intention detection step or device, a speed change step to give a vehicle acceleration after speed change equal to or above the target acceleration, based on the comparison results of the fourth acceleration comparison step or device.

Accordingly, if the down slope gradient changes during down slope speed change control, then down-shift control and up-shift control can be carried out even more precisely. Therefore exceptionally good down slope control can be continuously carried out without the driver experiencing excessive deceleration.

Further objects and aspects of the present invention will become apparent from the following description of embodiments given in conjunction with the appended drawings.

DESCRIPTION OF THE PREFERRED EMBODIMENTS

As follows is a description of embodiments of the present invention with reference to the drawings.

Figure 4:
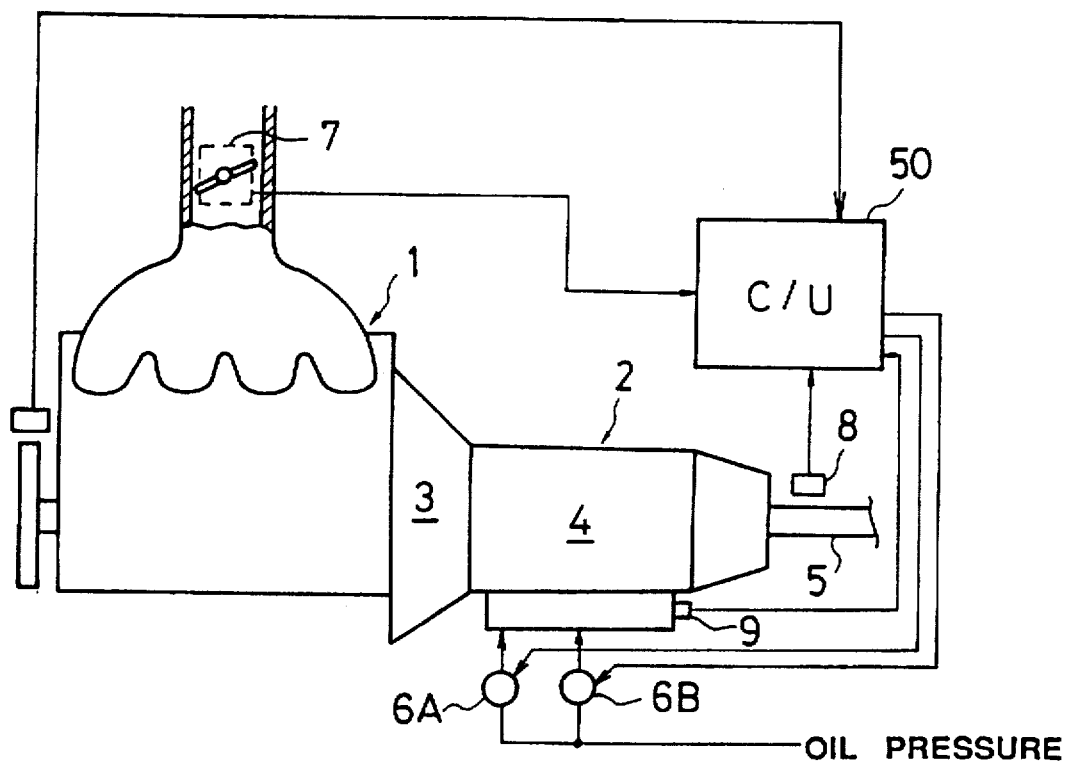
FIG. 4 is a system diagram according to a first embodiment.

With a first embodiment as shown in FIG. 4, an engine 1 is connected to an automatic transmission 2 whereby the generated torque of the engine 1 is transmitted to a vehicle drive wheel (not shown in the figure). The automatic transmission 2 comprises a torque converter 3 into which the torque generated by the engine 1 is input through the medium of a fluid, a multi-step type speed change gear mechanism 4 into which the output of the torque converter 3 is input to give a speed change output, and an oil pressure mechanism (not shown) for driving the speed change gear mechanism 4.

Solenoid valves 6A, 6B are assembled inside the oil pressure mechanism of the speed change gear mechanism 4. By switching open/close combinations of the solenoid valves 6A, 6B, engaged/disengaged combinations of respective clutches incorporated in the speed change gear mechanism 4 are changed, to thereby effect speed change to a desired speed change step.

On/off control of the plurality of solenoid valves is carried out based on control signals from a control unit 50 which comprises a CPU, ROM, RAM, A/D converter, input output interface and so on.

Signals from various sensors are input to the control unit 50. For the various sensors there is provided, a throttle valve sensor 7 serving as an engine load detection device which generates an output signal corresponding to the throttle valve opening TVO, and a vehicle speed sensor 8 serving as a vehicle speed detection device which detects a rotational speed of an output shaft 5 of the automatic transmission 2, and outputs a vehicle speed VSP.

Figure 1:
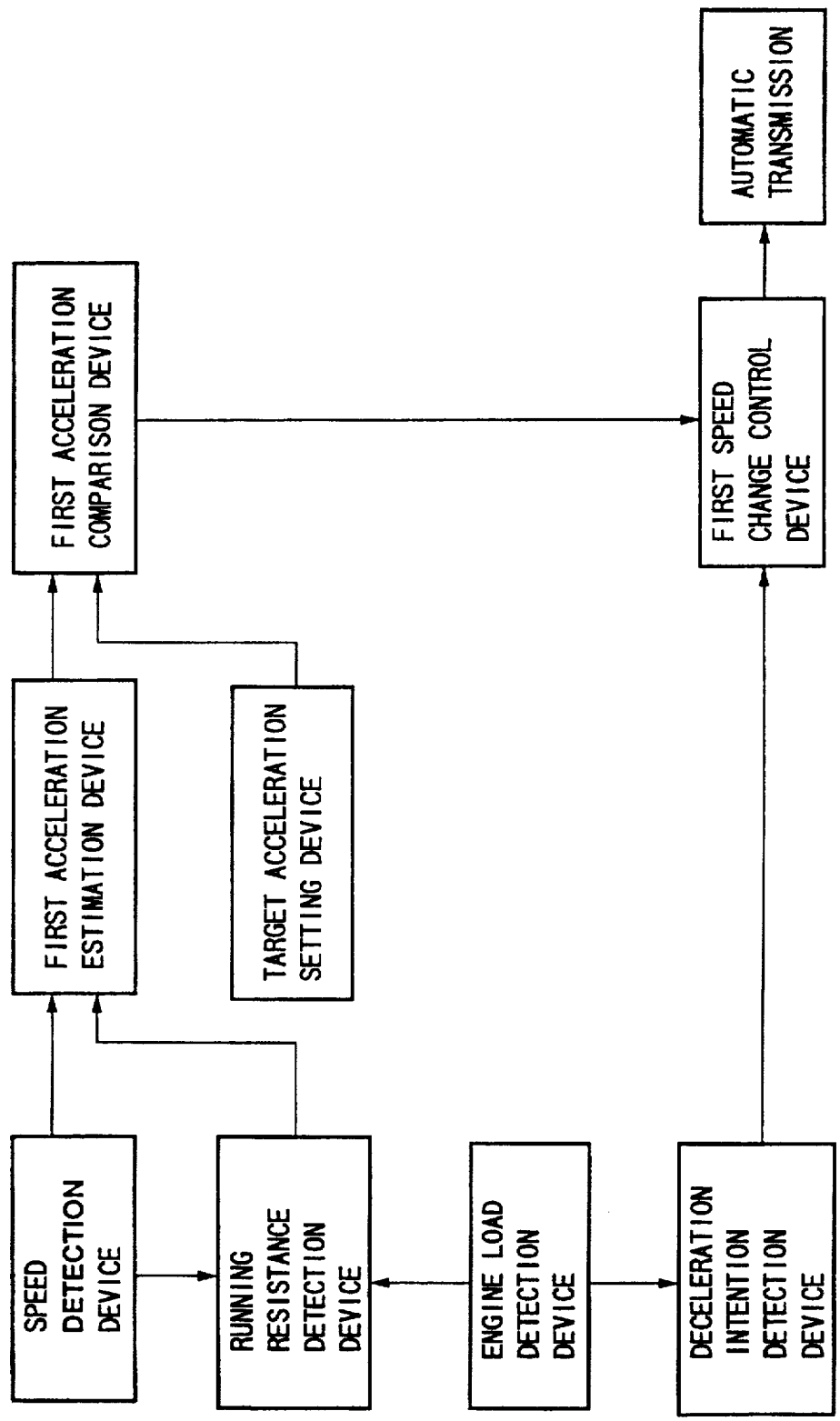
FIG. 1 is a functional block diagram according to a first aspect of the present invention.
Figure 5:
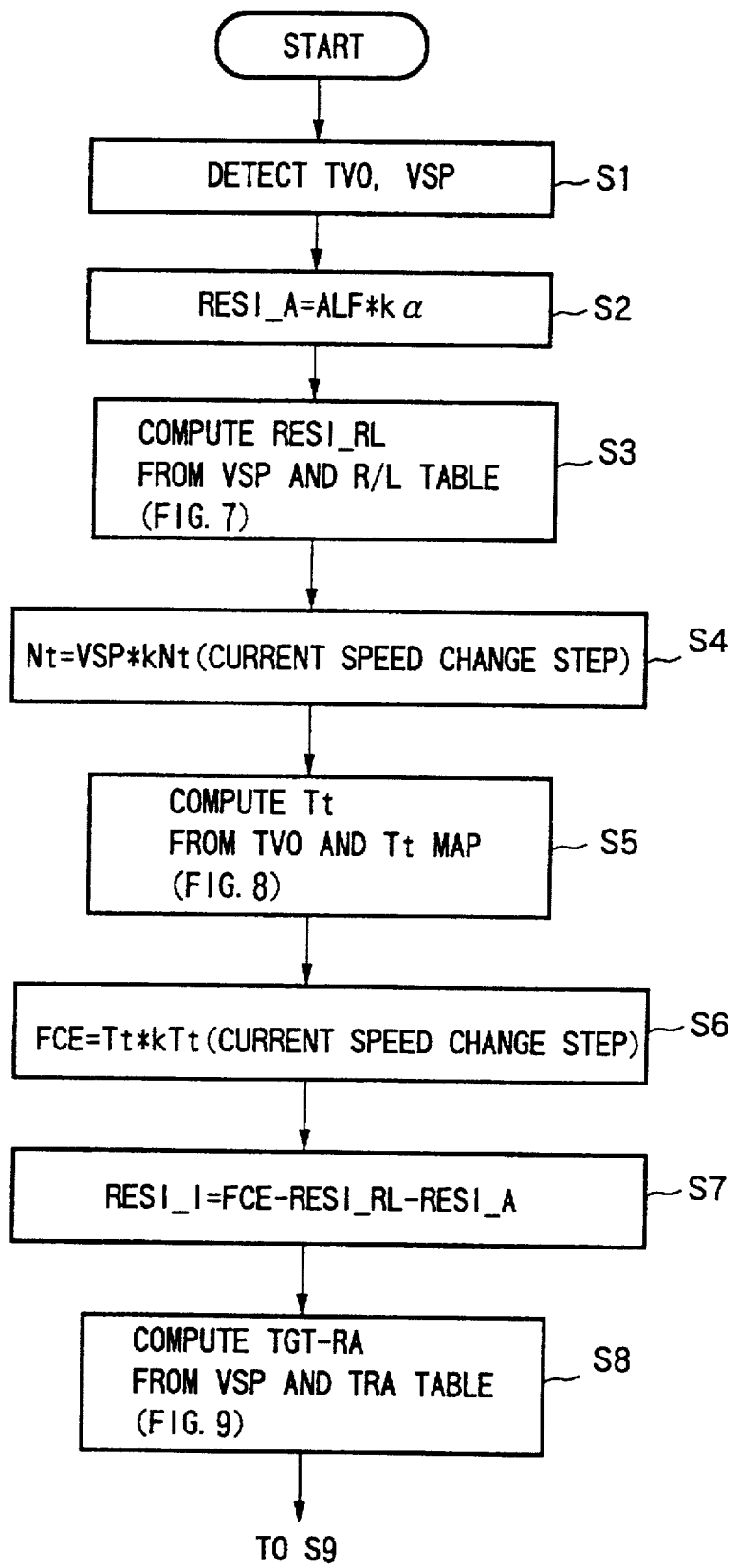
FIG. 5 is a flow chart (first flow chart) for explaining a down slope speed change control routine according to the first embodiment.
Figure 6:
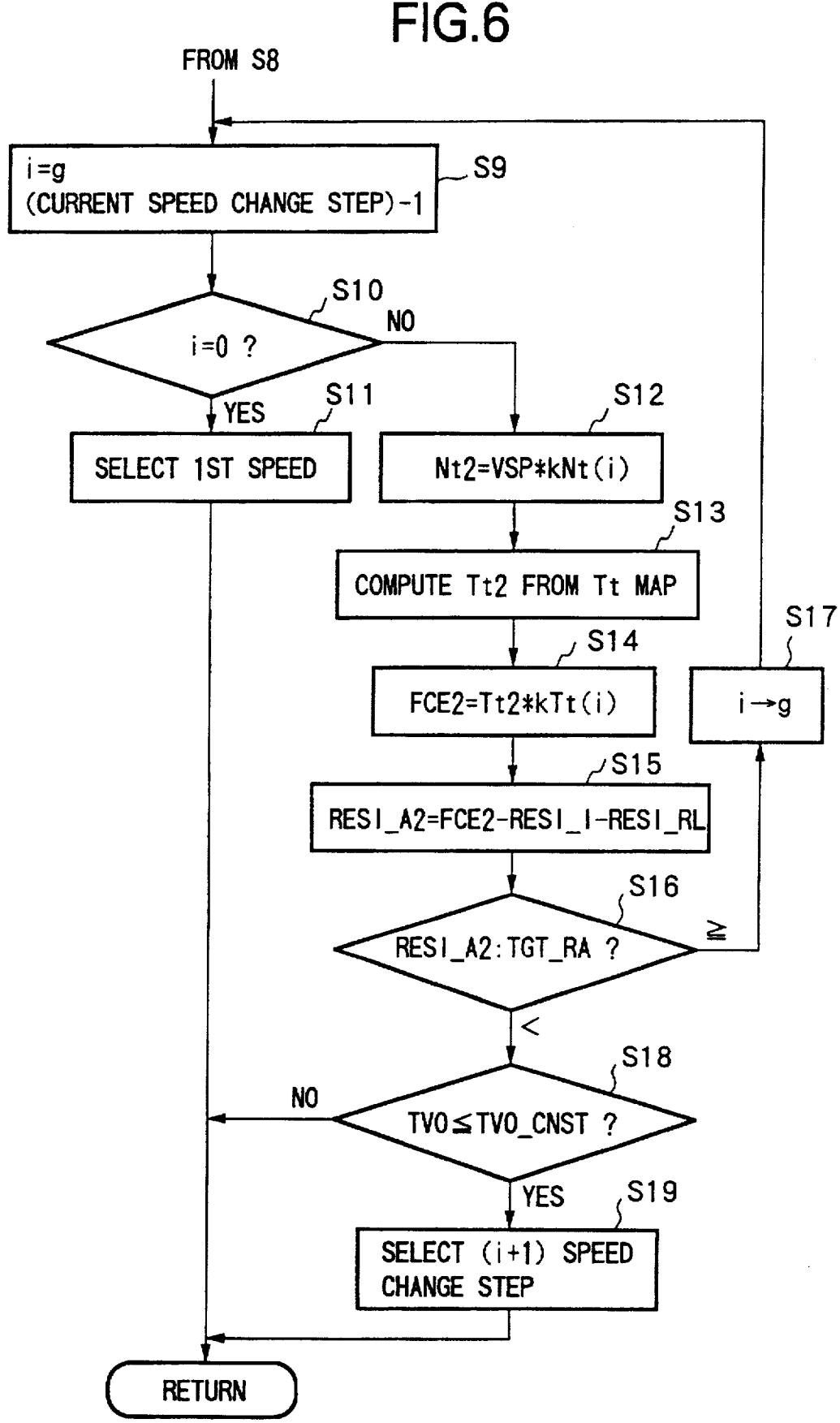
FIG. 6 is a flow chart (second flow chart) for explaining the down slope speed change control routine according to the first embodiment.

The functions of a vehicle running resistance detection device, deceleration intention detection device, first vehicle acceleration estimation device, target acceleration setting device (first target acceleration setting device), first acceleration comparison device, and first speed change control device, are realized by software stored in the control unit 50. A description of speed change control carried out by the control unit 50 for a down slope is given hereunder with reference to the flow charts of FIGS. 5 and 6. A schematic functional block diagram depiction of the operation of the first embodiment is also given in FIG. 1.

In step 1 (with step indicated by S in the figures), vehicle speed VSP and throttle valve opening TVO are detected.

Then in step 2, a current acceleration resistance (RESI-A) is obtained. The current acceleration resistance (RESI-A) can be obtained from the following equation:

$$RESI\text{-}A = ALF \times k\alpha$$

where: ALF is the current acceleration, and k α is an acceleration resistance computation constant (set according to vehicle weight and the like).

Figure 7:
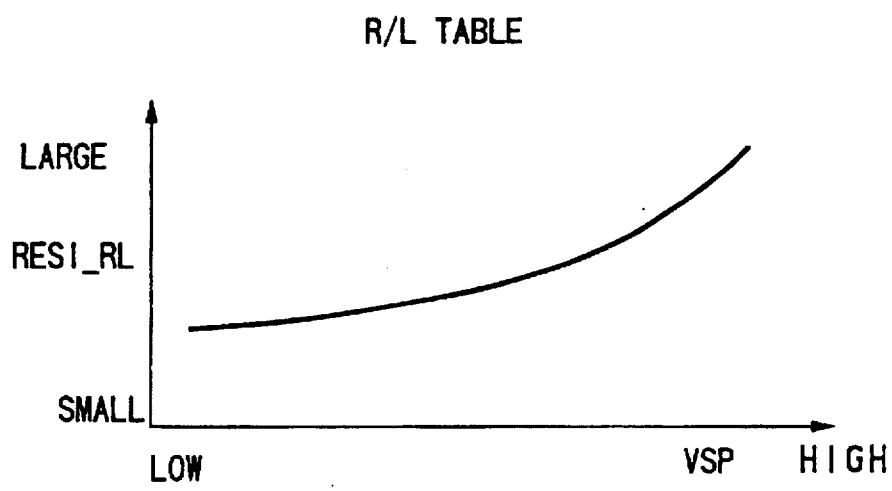
FIG. 7 is a graph showing an example of an R/L (air resistance plus rolling resistance) table.

In step 3, RESI-RL (air resistance+rolling resistance) is computed from the vehicle speed VSP and an R/L table (air resistance+rolling resistance computation table; see FIG. 7).

In step 4, a current turbine rotational speed (Nt, ie. torque converter 3 output shaft rotational speed) is obtained. The turbine rotational speed (Nt) may be obtained from the following equation:

$$Nt = VSP \times k\, Nt\ (g)$$

where: kNt (g) is a constant determined from the current speed change step, g being the current speed change step.

The current speed change step may be detected by providing a gear position sensor in the speed change gear mechanism 4, to detect the speed change position. However, determining the speed change step from a current speed change indication signal of the control unit 50 has a cost wise advantage.

Figure 8:
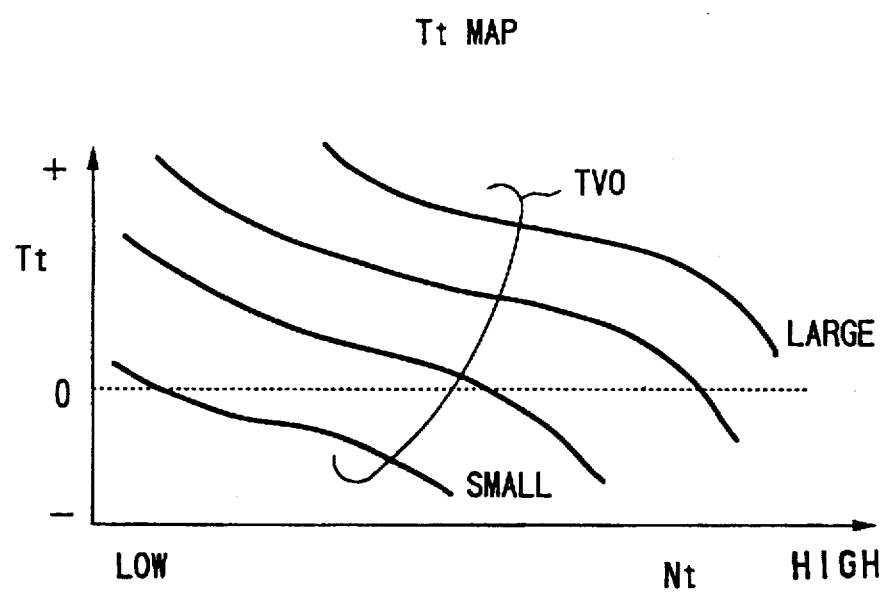
FIG. 8 is a graph showing an example of a Tt (turbine torque retrieval) map.

In step 5, the current turbine torque (Tt, ie. torque converter 3 output shaft torque) is obtained from a vehicle speed VSP and turbine torque Tt map (a three dimensional map of Nt, TVO, and Tt; see FIG. 8).

In step 6, a current drive force (FCE) is obtained from the following equation:

$$FCE = Tt \times k\, Tt\ (g)$$

where: k Tt (g) is a constant determined from the current speed change step, g being the current speed change step.

In step 7, the running resistance (RESI-I) is obtained from the following equation:

$$RESI\text{-}I = (FCE) - (RESI\text{-}RL) - (RESI\text{-}A)$$

Figure 9:
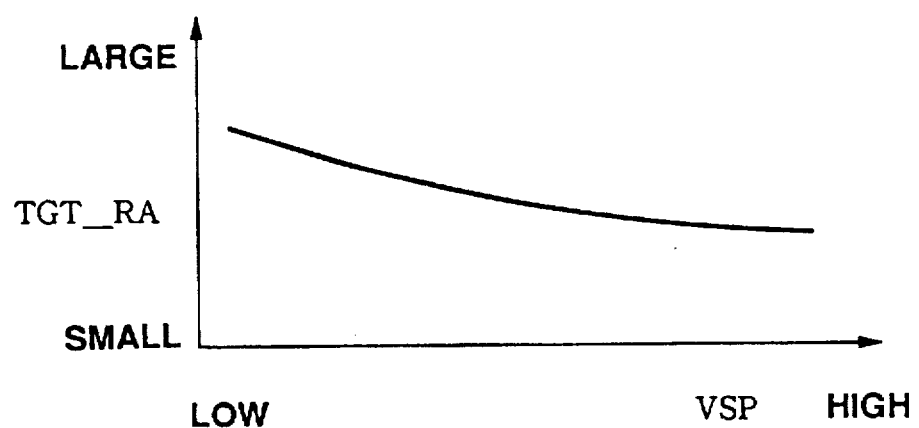
FIG. 9 is a graph showing an example of a TRA table (for computing down-shift or up-shift target acceleration)

In step 8, TGT-RA is computed from the vehicle speed VSP and a TRA table (TGT-RA computation table, see FIG. 9; TGT-RA is the "down-shift target acceleration"). The "down-shift target acceleration", for example with the present embodiment, this is preferably set in relation to step 19 (to be described later) for preventing excessive deceleration, to an acceleration which results in an excessive deceleration. Of course the down-shift target acceleration may be a value such that the desired deceleration characteristics after speed change are finally obtained. Moreover, the down-shift target acceleration may be a fixed value. However if this is set as with the present embodiment, corresponding to vehicle speed (or vehicle running resistance, current speed change step etc.), then the target acceleration can be set to a higher accuracy, resulting in high accuracy speed change control.

Step 8 constitutes the target acceleration setting device.

In step 9, a speed change step i after down-shift (=g−1, g being the current speed change step) is obtained.

In step 10, it is judged if i is zero. If so (0), then control proceeds to step 11, while if not (1), control proceeds to step 12.

In step 11, since the current speed change step is the first speed (speed 1), then further down-shift is not possible. The current instruction to the control unit 50 to select speed 1 is therefore maintained.

In step 12, since the current speed change step is not speed 1, down-shift is possible if required. The turbine rotational speed Nt2 for the case of down-shift is therefore obtained from the following equation:

$$Nt2 = VSP \times k\, Nt\ (i)$$

where: k Nt (i) is a constant determined for the speed change step after down-shift.

In step 13, the turbine torque (Tt2) for the case of down-shift is obtained from the vehicle speed VSP and the turbine torque Tt map.

In step 14, a drive force (FCE2) for the case of down-shift is obtained from the following equation:

$$FCE2 = Tt2 \times k\, Tt\ (i)$$

where: k Tt (i) is a constant determined for the speed change step after down-shift.

In step 15, the acceleration resistance (RESI-A2) for the case of down-shift is obtained from the following equation:

$$RESI\text{-}A2 = (FCE2) - (RESI\text{-}I) - (RESI\text{-}RL)$$

In step 16, the acceleration resistance (RESI-A2) for the case of down-shift, and the down-shift target acceleration (TGT-RA) are compared.

If the acceleration resistance (RESI-A2) is greater than or equal to the down-shift target acceleration (TGT-RA), then in step 17 the current i is set to g, and control then returns to step 9 to re-compute an acceleration resistance (RESI-A2) for the case of down-shift.

On the other hand, if the acceleration resistance (RESI-A2) is less than the down-shift target acceleration (TGT-RA), then a speed change step which gives an acceleration less than the down-shift target acceleration (for example excessive deceleration) has been found. Control therefore proceeds to step 18 where the deceleration (coasting) intention of the driver is verified, as materials to determine if down shift is to be actually carried out.

In step 18, it is judged if the throttle valve opening TVO is less than or equal to a deceleration intention judgment opening (TVO-cnst). With this deceleration intention judgment opening (TVO-cnst), a setting for example of fully closed is the closest to a deceleration intention of the driver. If engine load can be detected, then the deceleration intention of the driver can be judged from the amount of accelerator operation or the basic fuel injection pulse width Tp and so on. Without using a signal from the throttle valve sensor 7 as in the present embodiment, the presence or absence of a deceleration intention of the driver can be judged from a signal from an idle switch which produces an ON signal in the fully closed condition.

If the judgment of step 18 is YES (TVO≦TVO-cnst), this indicates that the driver intends to decelerate. Control therefore proceeds to step 19 to carry out actual down-shift.

Figure 10:
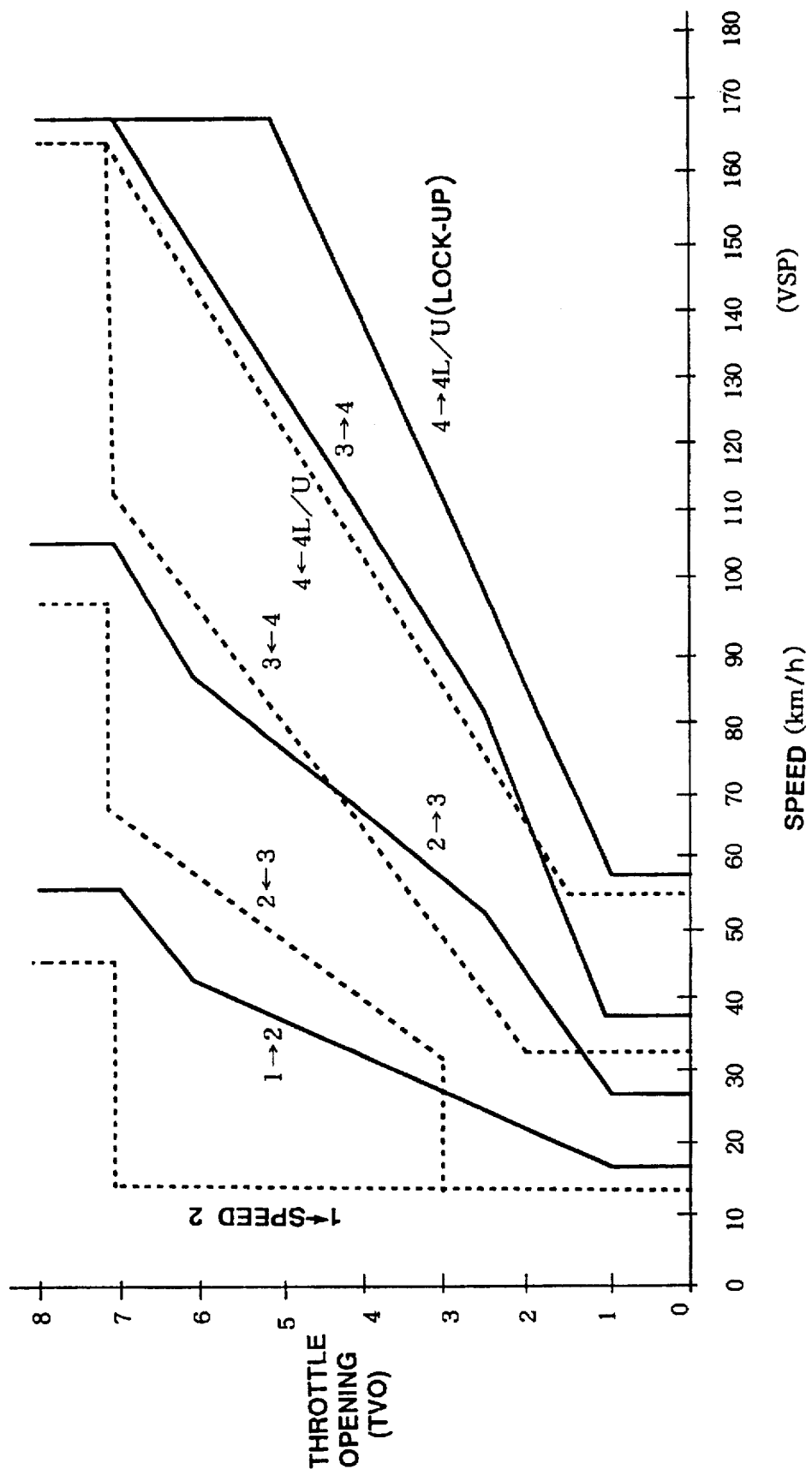
FIG. 10 is a graph for explaining a normal speed change pattern.

If the judgment of step 18 is NO (TVO>TVO-cnst), this indicates that the driver does not intend to decelerate. Forcible down-shift control for the down slope is therefore not carried out in order to respect the will of the driver and avoid giving a different sensation. The flow control is therefore terminated, and speed change control is carried out according to the normal speed change pattern (FIG. 10).

In step 19, since the driver actually intends to decelerate, then a speed change step (=i+1) with a "1" added to the presently set speed change step i for the case of down-shift is selected to send a speed change instruction to the control unit 50, and the flow control terminated. In this way, down-shift is carried out to a speed change step one step higher than the speed change step for excessive deceleration. It is thus possible to obtain good deceleration characteristics corresponding to the gradient without the driver experiencing a different sensation of an excessive engine braking effect. Hence the vehicle drivability on a down slope can be improved.

In this way, the acceleration resistance (RESI-A2) for the case of down-shift, and the down-shift target acceleration (TGT-RA) are compared in step 16, and when a speed change step wherein an acceleration for the case of down-shift is an excessive deceleration is found, then (in step 19) a speed change step on the higher speed side of the found speed change step is selected. Hence, effectively, a speed change step which gives a vehicle acceleration after speed change equal to or above the down-shift target acceleration (that is to say does not give excessive deceleration) is always selected. Therefore speed change control on a down slope can be reliably carried out without the driver experiencing a different sensation of an excessive engine braking effect.

This point is important since if the driver experiences even a slight excess deceleration, since the driver has no effective means to avoid this different sensation, it cannot be overcome. However, if a speed change step is selected to give a vehicle acceleration after speed change close to and above the target acceleration value, then for example even if the driver experiences this as a different sensation, since this will be one of excess acceleration, it can very easily overcome by applying the brake.

In this way, with the first embodiment, the acceleration resistance (RESI-A) for the case of down-shift, and the down-shift target acceleration (TGT-RA) are compared, and speed change is effected by selecting a speed change step which is one step higher than the speed change step giving excessive deceleration, so that the driver does not experience a difference sensation of excess deceleration. At this time, it is judged if there is a deceleration intention of the driver, based on the throttle valve operation (throttle valve opening TVO). In the case of no deceleration intention, forcible down-shift control for the down slope is prohibited in order to respect the will of the driver and avoid giving a different sensation, and speed change control is carried out according to the normal speed change pattern. Only in the case of a deceleration intention, is speed change to a speed change step one step higher than the speed change step giving excessive deceleration carried out. It is therefore possible to obtain good deceleration characteristics corresponding to the gradient, without the driver experiencing any different sensation of an excessive engine braking effect. Hence the vehicle drivability on a down slope can be optimized.

With the present embodiment, since speed change can be reliably carried out to a speed change step for an acceleration which does not give excessive deceleration (for example a value close to and above 0), the undesirable situation wherein the driver experiences a sensation of excessive deceleration, that is to say a continuing different sensation which cannot be overcome because the driver has no effective means for avoiding this, is not produced. Hence, with the present embodiment for example, even if the driver experiences a different sensation, since this is one of excess acceleration, it can be very easily overcome by applying the brake. The continuing different sensation experienced by the driver can therefore be stopped.

Figure 20:
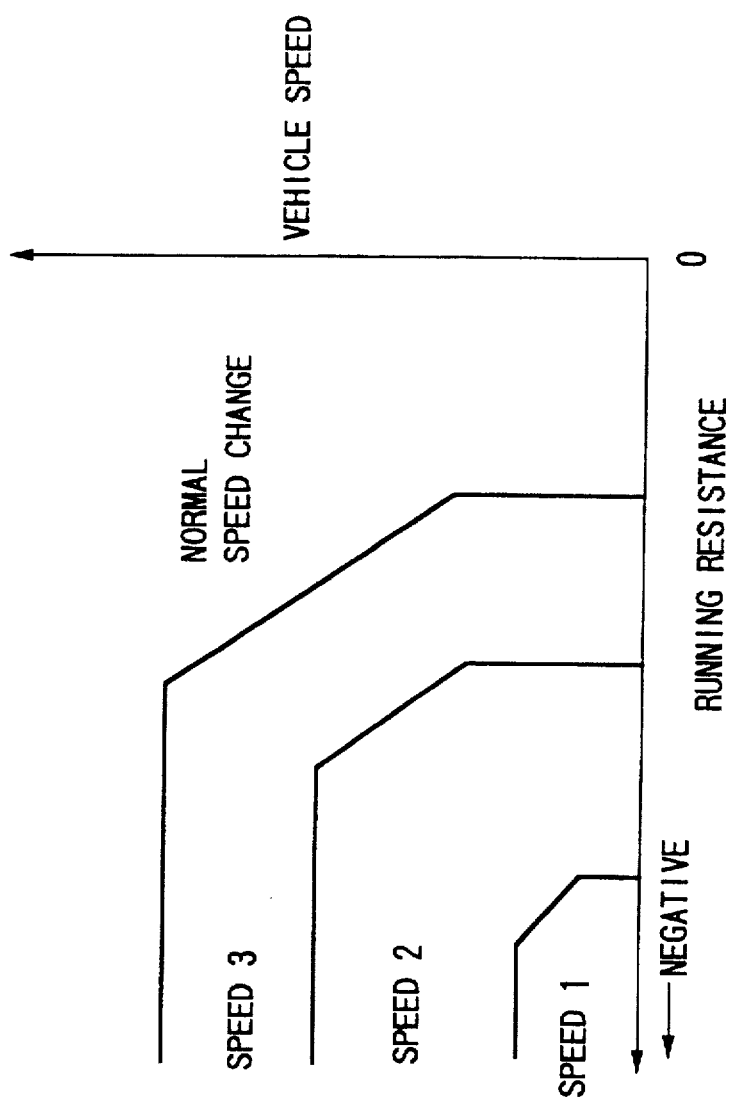
FIG. 20 is a map for setting speed change timing in accordance with a speed change step, according to a conventional example.

Furthermore, with the present embodiment, since the vehicle acceleration is estimated by computation and compared with the target acceleration to thereby select the speed change step, then a map requiring a large memory, as with the conventional arrangement (see FIG. 20) wherein the speed change timing is set in accordance with the speed change steps, is not required. Hence costs can be reduced.

Furthermore, since at the time of descent, the driver desires to travel with the throttle valve fully closed at a constant predetermined acceleration (for example approximately 0), then to correspond to this situation, estimation of the vehicle acceleration for the case of down-shift is preferably carried out with the throttle valve fully closed. In this way, more accurate down slope speed change control can be carried out to meet the requirements of the driver.

A description of a second embodiment will now be given.

With the first embodiment speed change was carried out to the down-shift side to enable travelling at a desired acceleration at the time of decent. However with the second embodiment speed change is carried out to the up-shift side to enable travelling at a desired acceleration at the time of decent.

Figure 2:
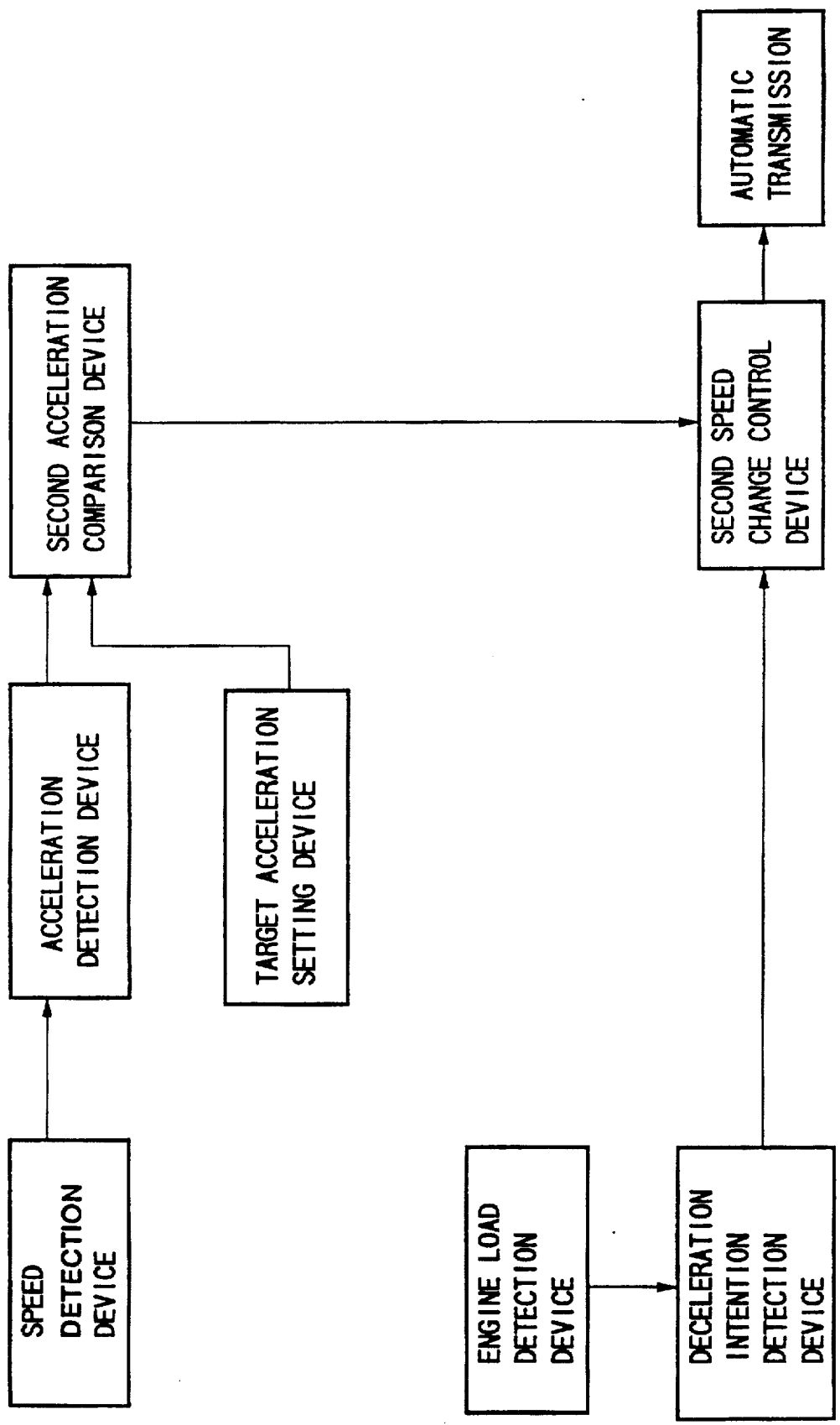
FIG. 2 is a functional block diagram according to a second aspect of the present invention.

That is to say, the second embodiment deals with the situation when the down slope gradient is gentle, or when the current speed change step is on the low side, and the driver will experience a different sensation of excess deceleration if up-shift is not carried out. A schematic functional black diagram depiction of the operation of this embodiment is also given in FIG. 2.

Figure 11:
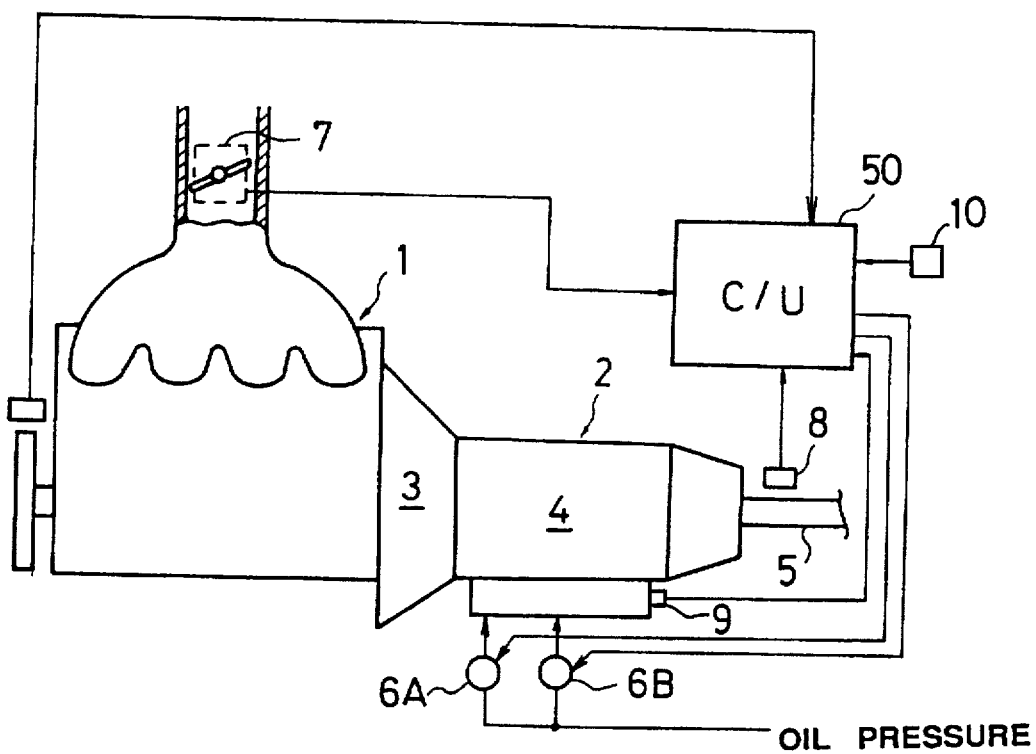
FIG. 11 is a system diagram according to a second embodiment.

The overall construction (system arrangement) of the second embodiment as shown in FIG. 11, is similar to that of the first embodiment with the exception of a brake switch 10 which sends an ON signal to the control unit 50 when the foot brake is pressed, and hence detailed description is omitted.

Figure 12:
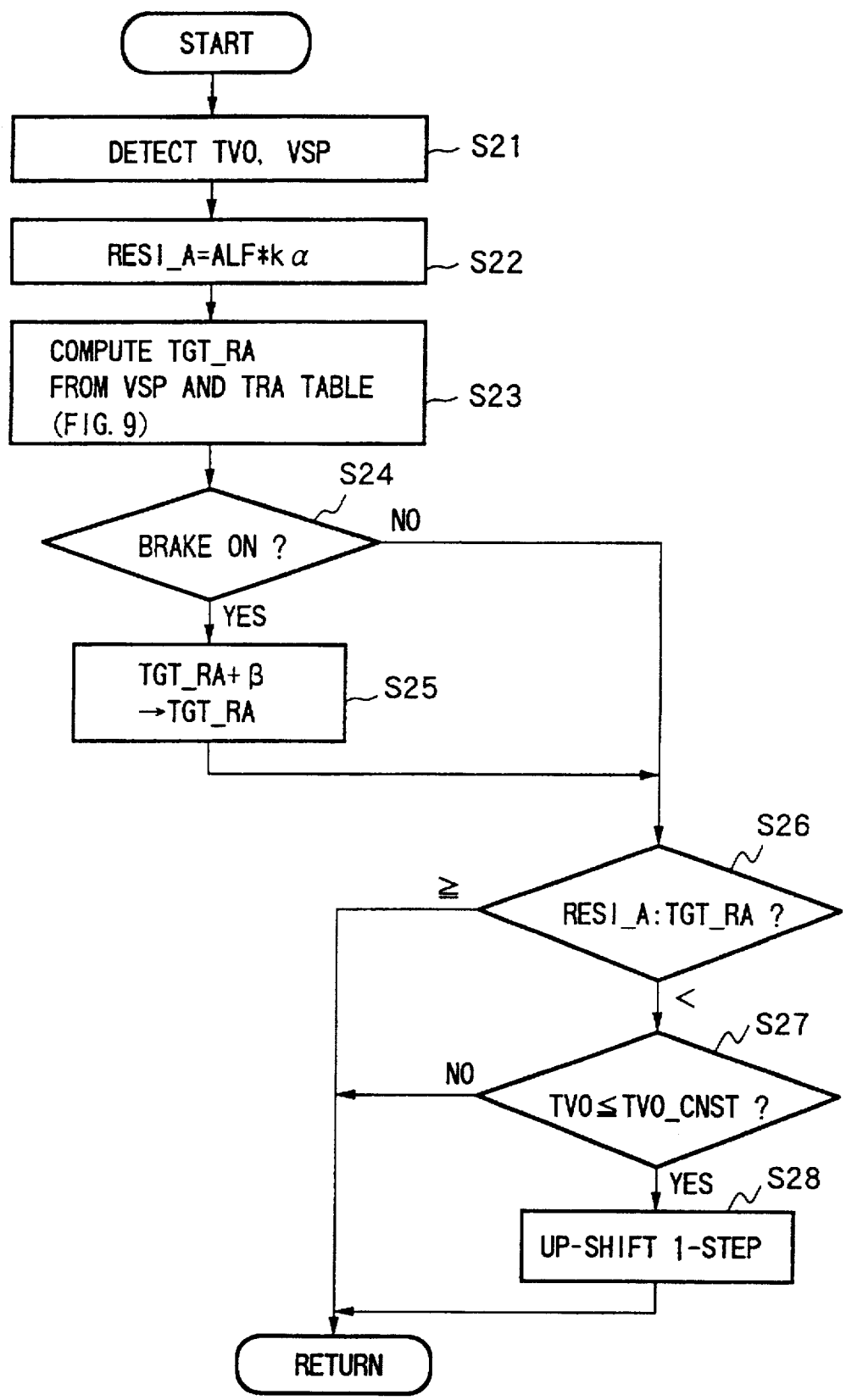
FIG. 12 is a flow chart for explaining a down slope speed change control routine according to the second embodiment.

The functions of a deceleration intention detection device, vehicle acceleration detection device, target acceleration setting device (second target acceleration setting device), second acceleration comparison device, and second speed change control device, are realized by software stored in the control unit 50. A description of speed change control carried out by the control unit 50 is given hereunder with reference to the flow chart of FIG. 12.

In step 21, vehicle speed VSP and throttle valve opening TVO are detected.

Then in step 22, a current acceleration resistance (RESI-A) is obtained. The current acceleration resistance (RESI-A) can be obtained from the following equation:

$$RESI\text{-}A = ALF \times k\, \alpha$$

where: ALF is the current acceleration, and $k\,\alpha$ is an acceleration resistance computation constant (set according to vehicle weight and the like).

In step 23, TGT-RA is computed from the vehicle speed VSP and the TRA table (TGT-RA computation table, see FIG. 9; here TGT-RA means the "up-shift target acceleration"). The "up-shift target acceleration", may be a value such that the desired deceleration characteristics (greater than and close to zero) are obtained. Moreover, the up-shift target acceleration may be a fixed value. However if this is set as with the present embodiment, corresponding to vehicle speed (or vehicle running resistance, current speed change step etc.), then the target acceleration can be set to a higher accuracy, resulting in high accuracy speed change control.

In step 24 it is judged if the brake switch 10 is ON. If so, control proceeds to step 25, while if not, control proceeds to step 26.

In step 25, a correction term β for when the brake is pressed, is added to the obtained up-shift target acceleration TGT-RA (TGT-RA+β→TGT-RA). Alternatively, RESI-A may be corrected.

In step 26, the current acceleration resistance (RESI-A), and the up-shift target acceleration (TGT-RA) are compared.

If the acceleration resistance (RESI-A) is greater than or equal to the up-shift target acceleration (TGT-RA), then the required acceleration has been obtained. The flow control is therefore terminated, and speed change control is carried out according to the normal speed change pattern (FIG. 10).

On the other hand, if the acceleration resistance (RESI-A) is less than the up-shift target acceleration (TGT-RA), then since deceleration will be excessive, it is necessary to up-shift to a speed change step which is one step higher than the current speed change step. However to verify the deceleration (coasting) intention of the driver, as materials to determine if up-shift is to be actually carried out, control proceeds to step 27.

In step 27, it is judged if the throttle valve opening TVO is less than or equal to a deceleration intention judgment opening (TVO-cnst).

If YES (TVO≦TVO-cnst), this indicates that the driver intends to decelerate. Control therefore proceeds to step 28.

If NO (TVO>TVO-cnst), this indicates that the driver does not intend to decelerate. Forcible up-shift control for the down slope is therefore not carried out in order to respect the will of the driver and avoid giving a different sensation. The flow control is therefore terminated, and speed change control is carried out according to the normal speed change pattern (FIG. 10).

In step 28, since the driver intends to decelerate (coast), then a speed change instruction is sent to the control unit 50 to up-shift to a speed change step which is one step higher than the current speed change step, and the flow control terminated. In this way, excessive deceleration with travelling in the current speed change step can be prevented. It is thus possible to obtain good deceleration characteristics corresponding to the gradient without the driver experiencing a different sensation of an excessive engine braking effect. Hence the vehicle drivability on a down slope can be improved. Of course, in the case of a 1-step up-shift when the current speed change step is the highest speed change step, then since further up-shift is not possible, the highest speed change step is maintained.

In this way, with the second embodiment, the current acceleration resistance (RESI-A), and the up-shift target acceleration (TGT-RA) are compared, and if in the current speed change step, the driver will experience excessive deceleration, then before up-shift to a speed change step which is one step higher than the current speed change step, it is judged if there is a deceleration (coasting) intention of the driver, based on the throttle valve operation (throttle valve opening TVO). In the case of no deceleration intention, forcible up-shift control for the down slope is prohibited in order to respect the will of the driver and avoid giving a different sensation, and speed change control is carried out according to the normal speed change pattern. On the other hand, in the case of a deceleration intention, up-shift to a speed change step one step higher than the current speed change step giving excessive deceleration is carried out. It is therefore possible with a simple construction to obtain good deceleration characteristics corresponding to the gradient, without the driver experiencing any different sensation of an excessive engine braking effect. Hence the vehicle drivability on a down slope can be optimized. The point that the driver does not experience excessive deceleration is the same as with the beforementioned first embodiment.

Furthermore, with the present embodiment also, since the speed change step is selected by computation, then a map requiring a large memory, as with the conventional arrangement (see FIG. 20) wherein the speed change timing is set in accordance with the speed change steps, is not required. Hence costs can be reduced.

With the second embodiment, it is judged if the brake is being pressed, and if being pressed, the current acceleration resistance or the target acceleration is corrected. Worsening of the speed change control due to pressing of the brake can thus be prevented. Alternatively, when the driver presses the brake, the down slope speed change control can be prohibited to thus prevent the driver experiencing a different sensation with the worsening of the speed change control due to pressing of the brake. Furthermore, the down slope speed change control can be carried out irrespective of pressing of the brake although there is a slight drop in accuracy. That is to say a construction with steps 24 and 25 omitted is also possible.

A third embodiment will now be described.

The third embodiment, is aimed at increasing the accuracy of the second embodiment, and deals with the situation when the down slope gradient is gentle, or when the current speed change step is on the low side, and the driver will experience a different or disconcerting sensation of excess deceleration if up-shift is not carried out.

The overall construction (system arrangement) of the third embodiment, is similar to that of the first embodiment, and hence description is omitted.

Figure 3:
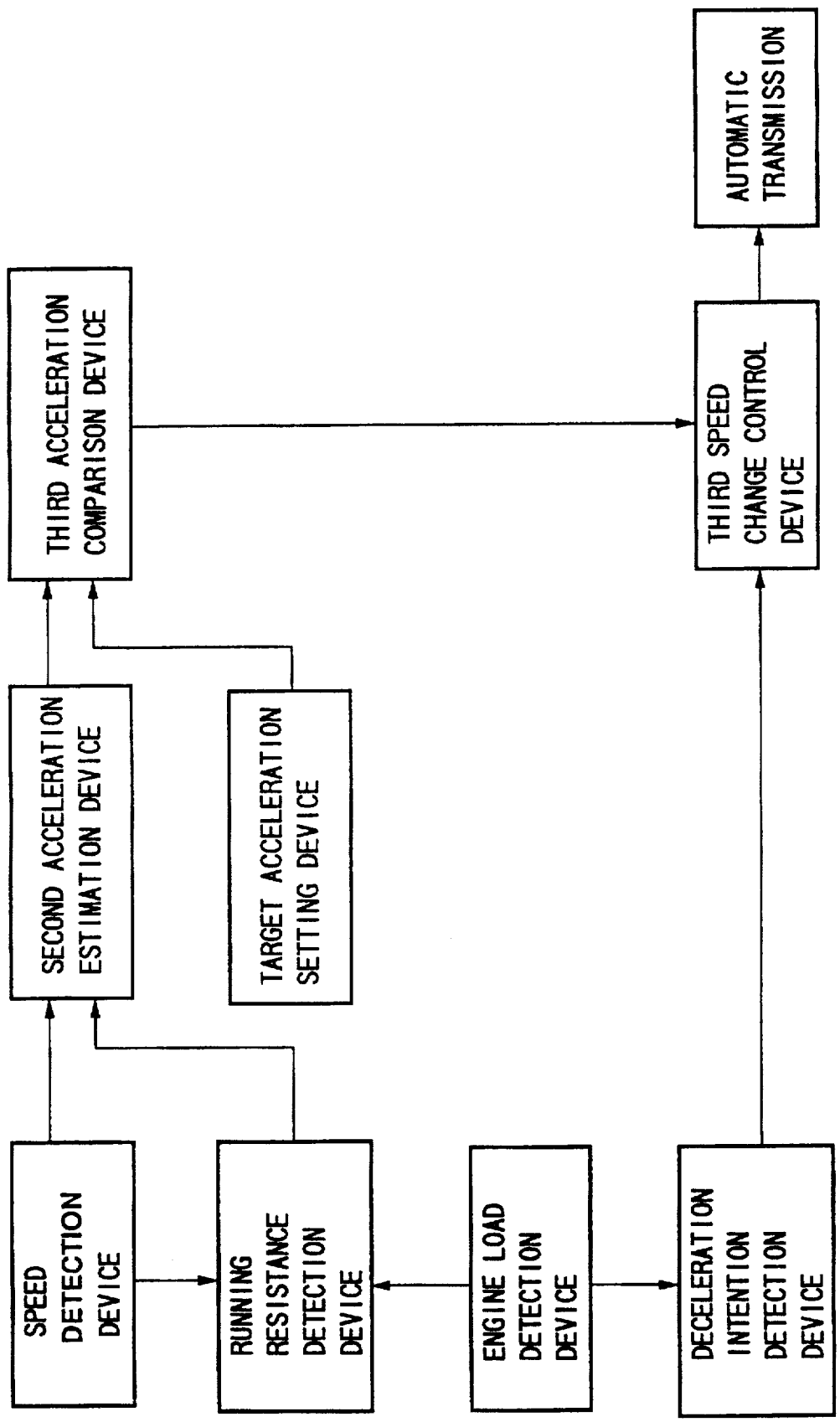
FIG. 3 is a functional block diagram according to a third aspect of the present invention.
Figure 13:
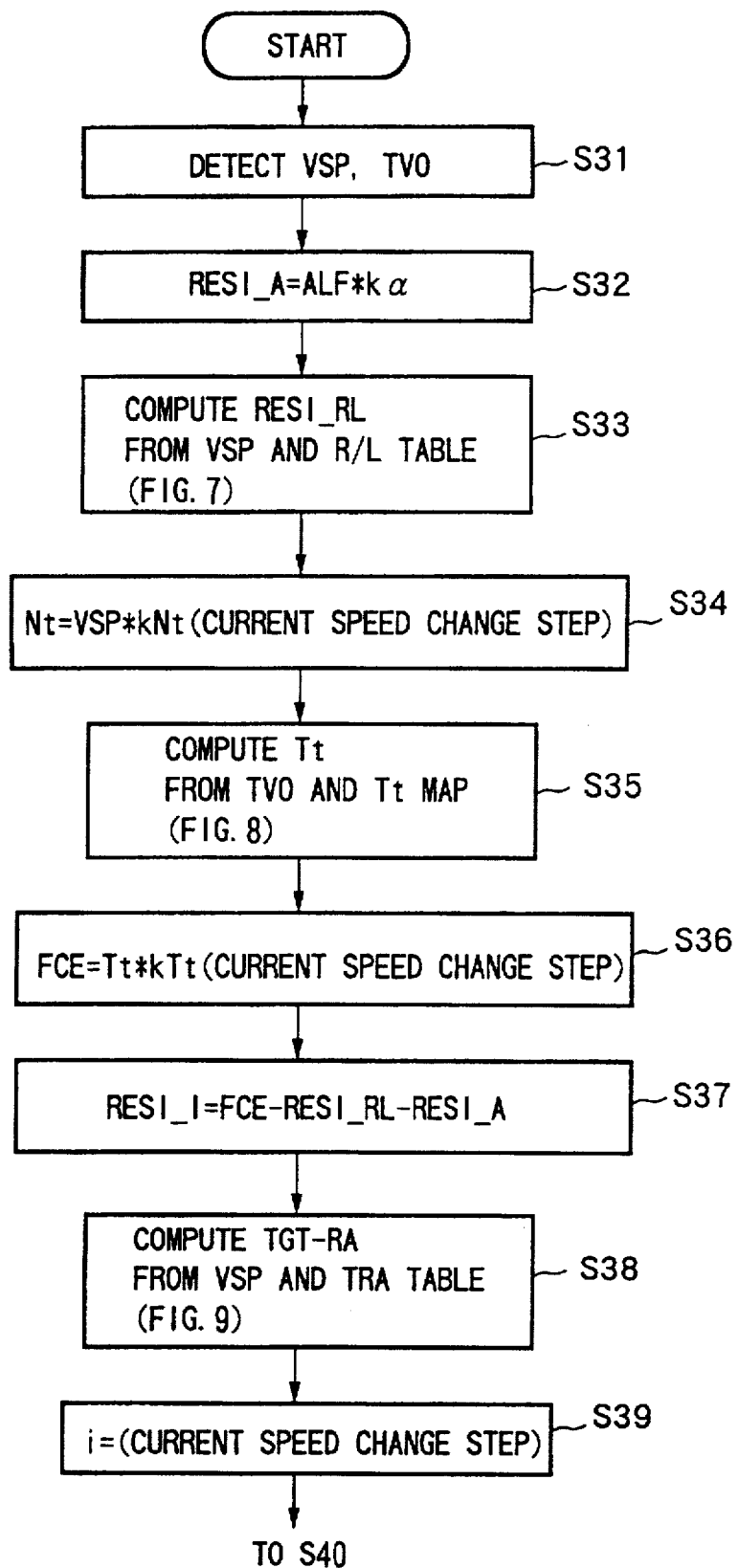
FIG. 13 is a flow chart (first flow chart) for explaining a down slope speed change control routine according to a third embodiment.
Figure 14:
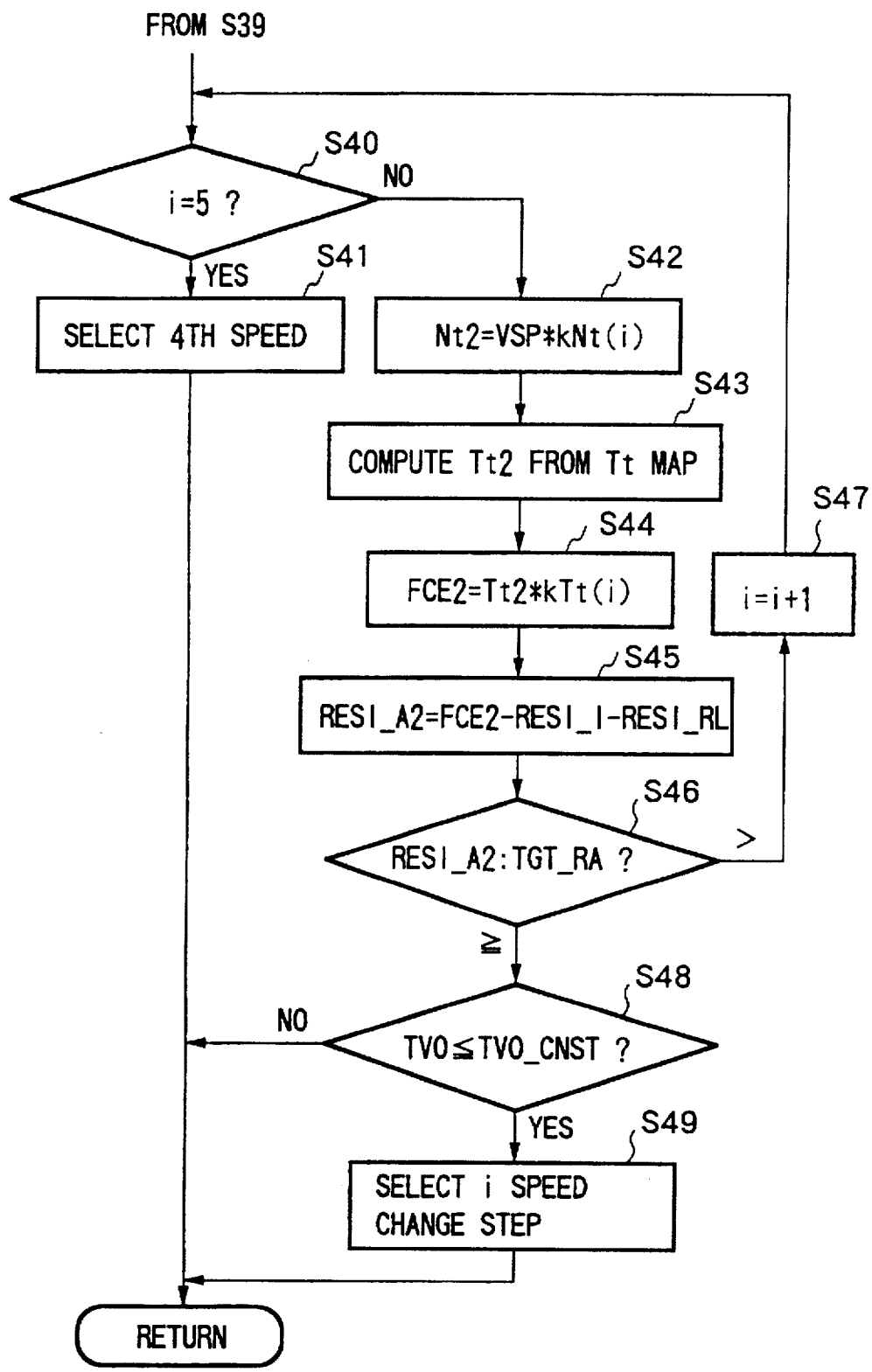
FIG. 14 is a flow chart (second flow chart) for explaining the down slope speed change control routine according to the third embodiment.

The functions of a deceleration intention detection device, vehicle running resistance detection device, second vehicle acceleration estimation device, target acceleration setting device (third target acceleration setting device), third acceleration comparison device, schematically depicted in functional black diagram form in FIG. 3, and third speed change control device, are realized by software stored in the control unit 50. A description of speed change control carried out by the control unit 50 is given hereunder with reference to the flow charts of FIGS. 13 and 14.

In step 31, vehicle speed VSP and throttle valve opening TVO are detected.

Then in step 32, the current acceleration resistance (RESI-A) is obtained in the same manner as before.

In step 33, RESI-RL (air resistance+rolling resistance) is computed from the vehicle speed VSP and the R/L table (see FIG. 7).

In step 34, the current turbine rotational speed Nt is obtained in the same manner as before.

In step 35, the current turbine torque Tt is obtained from the vehicle speed VSP and the turbine torque Tt map (see FIG. 8).

In step 36, the current drive force FCE (=Tt×k Tt (g)) is obtained in the same manner as before.

In step 37, the running resistance RESI-I (=(FCE)−(RESI-RL)−(RESI-A)) is obtained in the same manner as before.

In step 38, TGT-RA is computed from the vehicle speed VSP and the TRA table (TGT-RA computation table, see FIG. 9; here TGT-RA means the "up-shift target acceleration"). The "up-shift target acceleration", may be a value such that the desired deceleration characteristics (greater than and close to zero) are obtained. Moreover, the up-shift target acceleration may be a fixed value. However if this is set as with the present embodiment, corresponding to vehicle speed (or vehicle running resistance, current speed change step etc.), then the target acceleration can be set to a higher accuracy, resulting in high accuracy speed change control.

Step 38 constitutes the target acceleration setting device or the second target acceleration setting device.

In step 39, the current speed change step is made i.

In step 40 it is judged if the currently set i is "5". If so, then control proceeds to step 41, while if not, control proceeds to step 42. Since the present embodiment is concerned with a fourth speed speed changer, it is not possible to speed change to a fifth speed. Hence in step 40 it is judged if i is a "5". In this respect, the judgment value (upper limit+1) is appropriately modified to correspond to the number of speed change steps of the speed changer in the vehicle.

In step 41, the fourth speed (speed 4) is selected and the flow control then terminated.

In step 42, the turbine rotational speed Nt2 for the currently set step i is obtained from the following equation:

$$N_2 = VSP \times k\, Nt\,(i)$$

where k Nt(i) is a constant determined for the speed change step i.

In step 43, the turbine torque (Tt2) for the speed change step i, is obtained from the vehicle speed VSP and the turbine torque Tt map.

In step 44, a drive force (FCE2) for the speed change step i is obtained from the following equation:

$$FCE2 = Tt2 \times k\, Tt\,(i)$$

where: k Tt (i) is a constant determined for the speed change step i.

In step 45, the acceleration resistance (RESI-A2) for the currently set speed change step i is obtained from the following equation:

$$RESI\text{-}A2 = (FCE2) - (RESI\text{-}I) - (RESI\text{-}RL)$$

In step 46, the acceleration resistance (RESI-A2) for the currently set speed change step i, and the up-shift target acceleration (TGT-RA) are compared.

If the acceleration resistance (RESI-A2) is less than the up-shift target acceleration (TGT-RA), the required acceleration is not obtained (excessive deceleration). Control therefore returns to step 40 to give an up-shift, after first setting i to i+1 in step 47.

On the other hand, if the acceleration resistance (RESI-A2) is greater than or equal to the up-shift target acceleration (TGT-RA), then a speed change step which gives an acceleration greater than or equal to the up-shift target acceleration (which does not give excessive deceleration) has been found. Control therefore proceeds to step 48 where the deceleration (coasting) intention of the driver is verified, as materials to determine if down shift is to be actually carried out.

In step 48, it is judged if the throttle valve opening TVO is less than or equal to a deceleration intention judgment opening (TVO-cnst).

If the judgment of step 48 is YES (TVO≦TVO-cnst), this indicates that the driver actually intends to decelerate. Control therefore proceeds to step 49. In step 49, a signal is sent to the control unit 50 to up-shift to the speed change step i set in the beforementioned step so that deceleration is not excessive, and the flow control is terminated.

If the judgment of step 48 is NO (TVO>TVO-cnst), this indicates that the driver does not intend to decelerate. Forcible up-shift control for the down slope is therefore not carried out in order to respect the will of the driver and avoid giving a different sensation. The flow control is therefore terminated, and speed change control is carried out according to the normal speed change pattern (FIG. 10).

In this way, with the third embodiment, speed change is carried out by comparing the acceleration resistance (RESI-A2) for the case of up-shift, with the up-shift target acceleration (TGT-RA) to select a speed change step which gives a desired acceleration without excessive deceleration at the time of down slope coasting. At this time, it is judged if there is a deceleration intention of the driver, based on the throttle valve operation (throttle valve opening TVO). In the case of no deceleration intention, forcible up-shift control for the down slope is prohibited in order to respect the will of the driver and avoid giving a different sensation, and speed change control is carried out according to the normal speed change pattern. Only in the case of a deceleration intention, is the beforementioned speed change control carried out. It is therefore possible to obtain good deceleration characteristics corresponding to the gradient, without the driver experiencing any different sensation of an excessive engine braking effect. Hence the vehicle drivability on a down slope can be optimized.

Furthermore, with the present embodiment also, since the speed change step is selected by computation, then a map requiring a large memory, as with the conventional arrangement (see FIG. 20) wherein the speed change timing is set in accordance with the speed change steps, is not required. Hence costs can be reduced.

Since at the time of descent, the driver desires to travel with the throttle valve fully closed at a constant predetermined acceleration (for example approximately 0), then to correspond to this situation, estimation of the vehicle acceleration for the case of up-shift is preferably carried out with the throttle valve fully closed. In this way, more accurate down slope speed change control can be carried out to meet the requirements of the driver.

Figure 15:
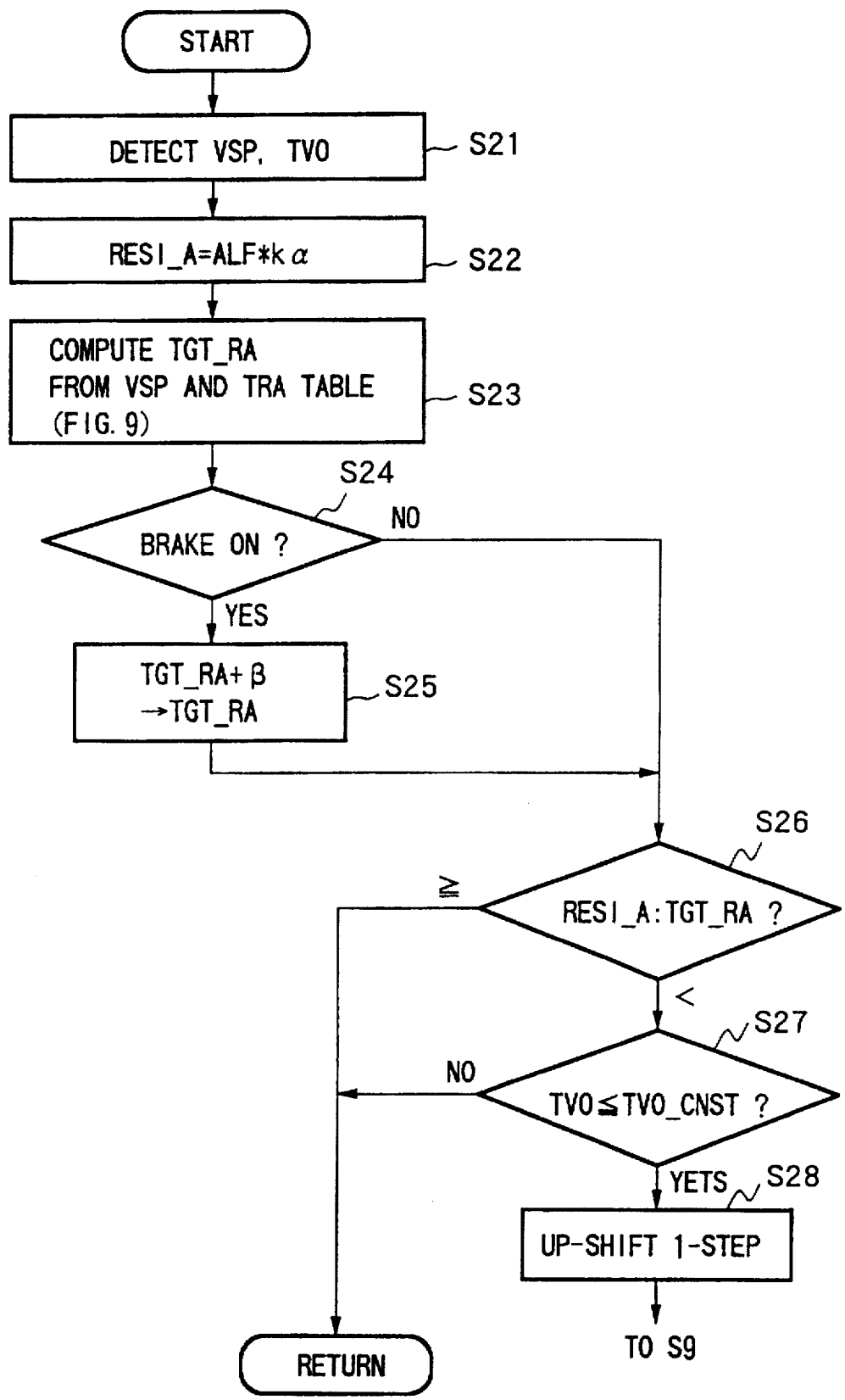
FIG. 15 is a flow chart (first flow chart) for explaining a down slope speed change control routine for a case wherein the first embodiment and the second embodiment are combined together.
Figure 16:
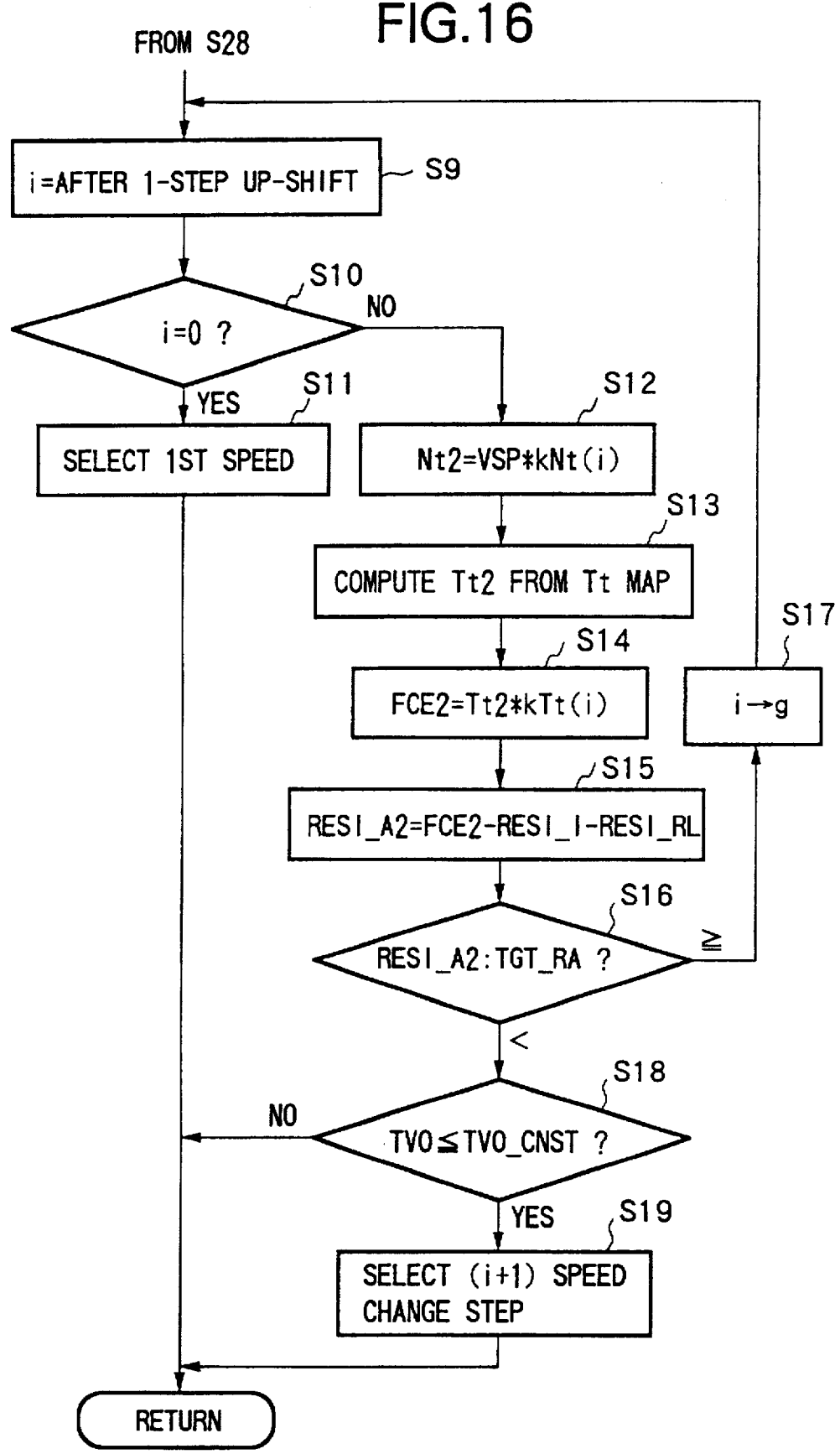
FIG. 16 is a flow chart (second flow chart) for explaining the down slope speed change control routine for the case wherein the first embodiment and the second embodiment are combined together.
Figure 17:
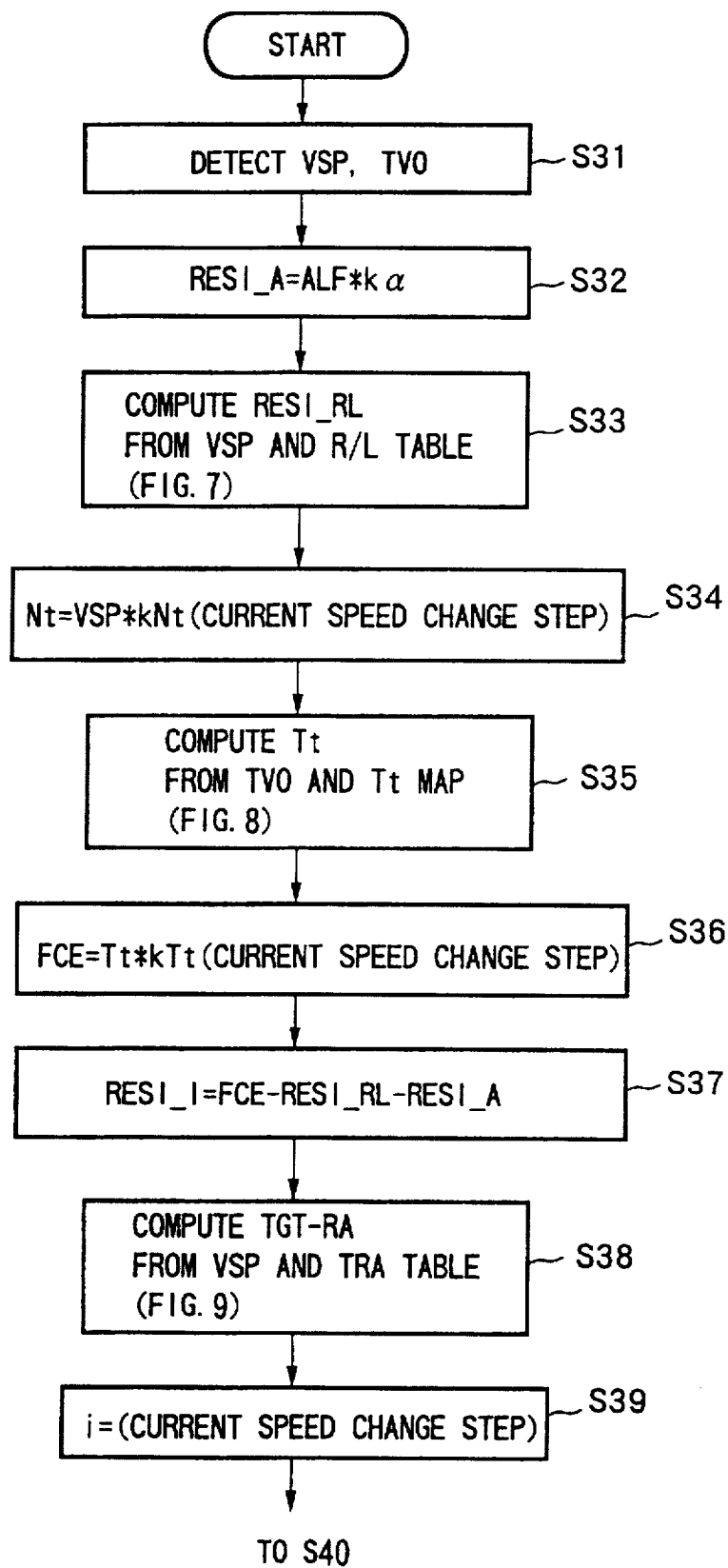
FIG. 17 is a flow chart (first flow chart) for explaining a down slope speed change control routine for a case wherein the first embodiment and the third embodiment are combined together.
Figure 18:
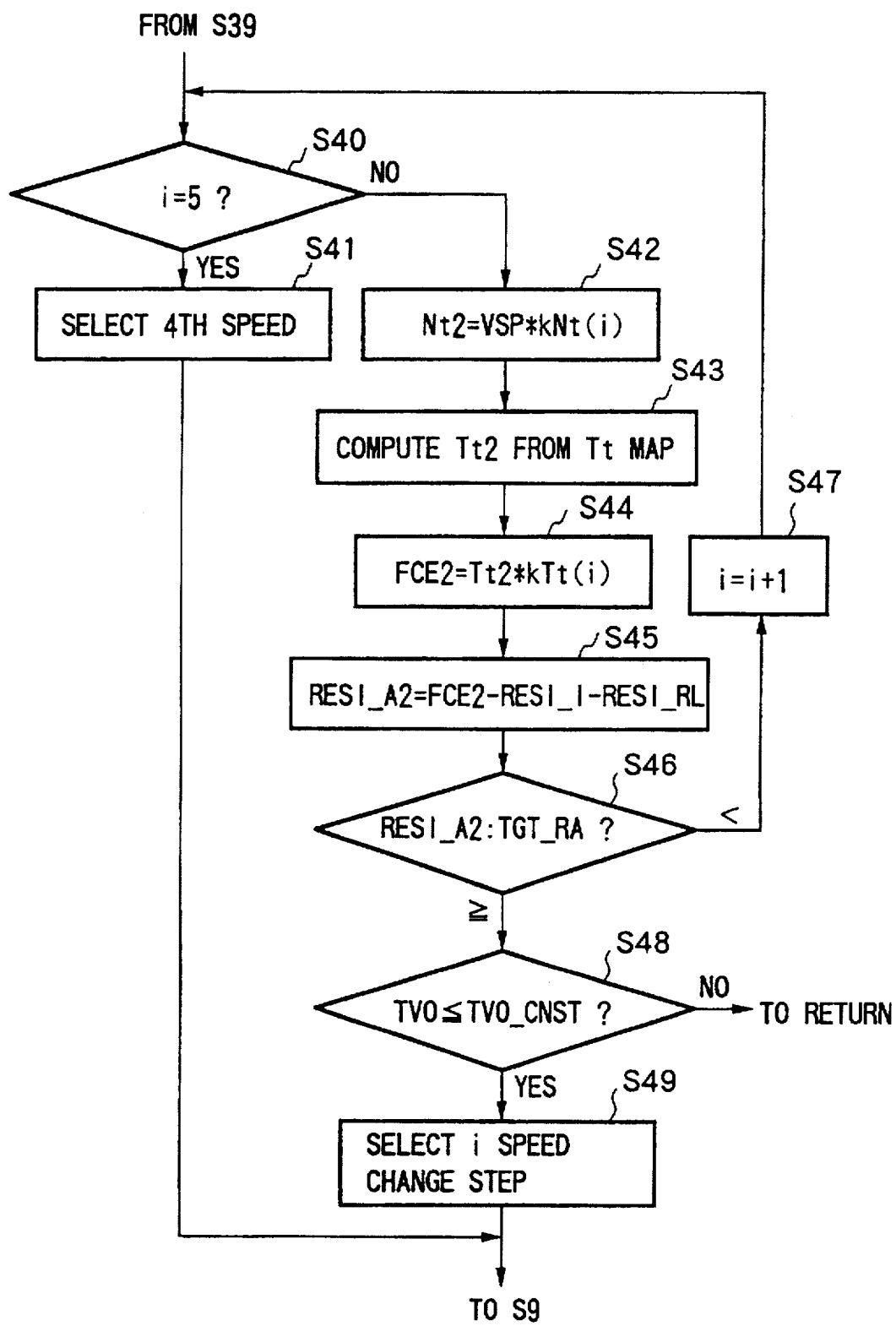
FIG. 18 is a flow chart (second flow chart) for explaining the down slope speed change control routine for the case wherein the first embodiment and the third embodiment are combined together.
Figure 19:
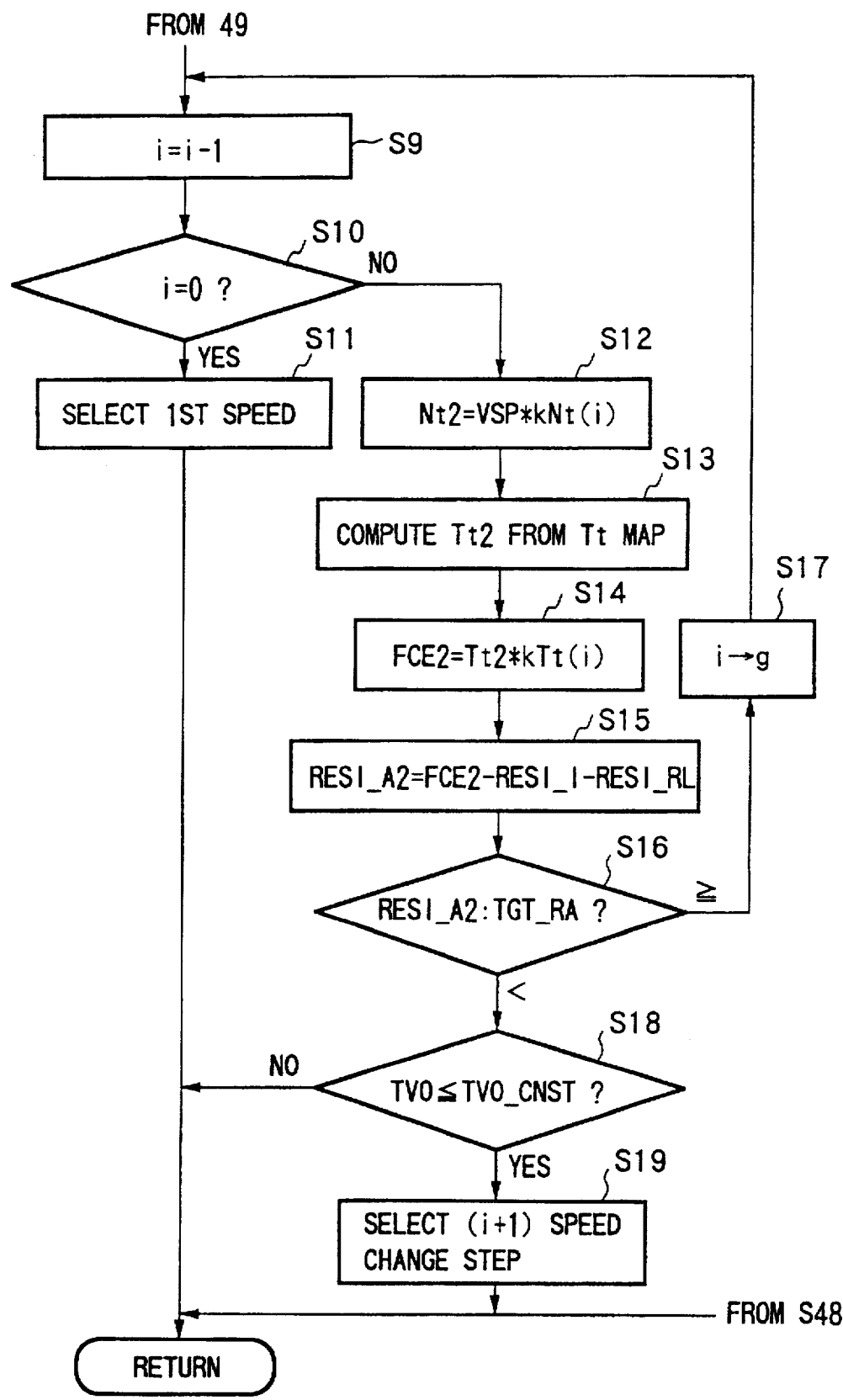
FIG. 19 is a flow chart (third flow chart) for explaining the down slope speed change control routine for the case wherein the first embodiment and the third embodiment are combined together.

The abovementioned respective embodiments, have been described in relation to arrangements wherein down-shift control or up-shift control is carried out separately to obtain a desired acceleration at the time of down slope coasting. However in the case where the gradient of the down slope changes along the down slope, good acceleration control cannot be obtained since with down-shift control there is no up-shift and with up-shift control there is no down-shift. Therefore, to carry out even better control, a construction is preferable wherein the down-shift control and up-shift control are combined together as shown for example in FIGS. 15 and 16 (an example with the first and second embodiments combined) and FIGS. 17 through 19, (an example with the first and third embodiments combined).

Moreover, with the above respective embodiments, the deceleration intention of the driver is detected. The operation or condition which can be most quickly detected to reveal the deceleration intention of the driver is the engine load (related for example to the throttle valve opening, amount of accelerator pedal operation and the like). Hence by detecting the engine load, the deceleration intention of the driver can be most quickly and accurately detected. Therefore, the accuracy of speed change control at the time of a down slope can be increased.

With the first and the third embodiments there is no judgment for pressing of the brake as with the second embodiment. However these embodiments can be modified so that, as with the second embodiment, when the brake is pressed, the vehicle running resistance (RESI-A) or the target acceleration is corrected so as to prevent worsening of the speed change control due to pressing of the brake. Alternatively, when the driver presses the brake, the down slope speed change control can be prohibited to thus prevent the driver experiencing a different sensation with the worsening of the speed change control due to pressing of the brake.

What is claimed is:

1. A method of controlling the speed change of a vehicle automatic transmission which is connected to an engine output shaft, said method comprising:

a vehicle speed detection step for detecting vehicle speed;

a vehicle running resistance detection step for detecting vehicle running resistance;

an engine load detection step for detecting engine load;

a deceleration intention detection step for detecting a deceleration intention of a driver based on the engine load;

a vehicle acceleration estimation step for estimating vehicle acceleration in the case of a speed change to a speed change step on a lower speed side of a current speed change step, based on the vehicle speed and vehicle running resistance;

a target acceleration setting step for setting a target acceleration;

an acceleration comparison step for comparing the vehicle acceleration estimated by said vehicle acceleration estimation step, with the target acceleration set by said target acceleration setting step; and a speed change control step for controlling speed change by selecting, at the time of detecting a deceleration intention of the driver, a speed change step to give a vehicle acceleration equal to or above the target acceleration, based on the comparison results of said acceleration comparison step.

2. A method of controlling the speed change of a vehicle automatic transmission which is connected to an engine output shaft, said method comprising:

a vehicle speed detection step for detecting vehicle speed;

an engine load detection step for detecting engine load;

a deceleration intention detection step for detecting a deceleration intention of a driver based on the engine load;

a vehicle acceleration detection step for detecting vehicle acceleration;

a target acceleration setting step for setting a target acceleration;

an acceleration comparison step for comparing the vehicle acceleration detected by said vehicle acceleration detection step, with the target acceleration set by said target acceleration setting step; and a speed change control step for controlling speed change from a current speed change step to a speed change step on the higher side, when a deceleration intention of the driver is detected by said deceleration intention detection step, and the comparison results of said second acceleration comparison step, give the vehicle acceleration detected by said vehicle acceleration detection step as less than the target acceleration.

3. A method of controlling the speed change of a vehicle automatic transmission which is connected to an engine output shaft, said method comprising:

a vehicle speed detection step for detecting vehicle speed;

a vehicle running resistance detection step for detecting vehicle running resistance;

an engine load detection step for detecting engine load;

a deceleration intention detection step for detecting a deceleration intention-of a driver based on the engine load;

a vehicle acceleration estimation step for estimating vehicle acceleration in the case of travelling in a speed change step on a high speed side of the current speed change step, based on the vehicle speed and vehicle running resistance;

a target acceleration setting step for setting a target acceleration;

an acceleration comparison step for comparing the vehicle acceleration estimated by said second vehicle acceleration estimation step, with the target acceleration, and a speed change control step for controlling speed change by selecting, at the time of detecting a deceleration intention of the driver by said deceleration intention detection step, a speed change step to give a vehicle acceleration estimated by said vehicle acceleration estimation step as being equal to or above the target acceleration, based on the comparison results of said acceleration comparison step.

4. An apparatus for controlling the speed change of a vehicle automatic transmission which is connected to an engine output shaft, said apparatus comprising:

vehicle speed detection means for detecting vehicle speed;

vehicle running resistance detection means for detecting vehicle running resistance;

engine load detections means for detecting engine load;

deceleration intention detection means for detecting a deceleration intention of a driver based on the engine load;

vehicle acceleration estimation means for estimating vehicle acceleration in the case of a speed change to a speed change step on a lower speed side of a current speed change step, based on the vehicle speed and vehicle running resistance;

target acceleration setting means for setting a target acceleration;

acceleration comparison means for comparing the vehicle acceleration estimated by said vehicle acceleration estimation means, with the target acceleration set by said target acceleration setting means; and speed change control means for controlling speed change by selecting, at the time of detecting a deceleration intention of the driver by said deceleration intention detection means, a speed change step to give a vehicle acceleration equal to or above the target acceleration, based on the comparison results of said acceleration comparison means.

5. An apparatus for controlling the speed change of a vehicle automatic transmission according to claim 4, wherein said vehicle acceleration estimation means estimates a vehicle acceleration when the throttle valve is fully closed.

6. An apparatus for controlling the speed change of a vehicle automatic transmission according to claim 4, wherein said speed change control means controls speed change by selecting a speed change step on a lower speed side of the speed change steps which give a vehicle acceleration estimated by said vehicle acceleration estimation means to be equal to or above the target acceleration.

7. An apparatus for controlling the speed change of a vehicle automatic transmission according to claim 4, wherein at the time of brake operation, speed change control by said speed change control means is not carried out.

8. An apparatus for controlling the speed change of a vehicle automatic transmission which is connected to an engine output shaft, said apparatus comprising:

vehicle speed detection means for detecting vehicle speed;

engine load detection means for detecting engine load;

deceleration intention detection means for detecting a deceleration intention of a driver based on the engine load;

vehicle acceleration detection means for detecting vehicle acceleration;

target acceleration setting means for setting a target acceleration and;

acceleration comparison means for controlling a speed change from a current speed change step to a speed change step on a higher side of the current speed change step, when a deceleration intention of the driver is detected by said deceleration intention detection means, and the comparison results of said acceleration comparison means, give the vehicle acceleration detected by said vehicle acceleration detection means as less than the target acceleration.

9. An apparatus for controlling the speed change of a vehicle automatic transmission according to claim 8, wherein at the time of brake operation, speed change control by said speed change control means is not carried out.

10. An apparatus for controlling the speed change of a vehicle automatic transmission which is connected to an engine output shaft, said apparatus comprising:

vehicle speed detection means for detecting vehicle speed;

vehicle running resistance detection means for detecting vehicle running resistance;

engine load detection means for detecting engine load;

deceleration intention detection means for detecting a deceleration intention of a driver based on the engine load;

vehicle acceleration estimation means for estimating vehicle acceleration in the case of travelling in a speed change step on a high speed side of the current speed change step, based on the vehicle speed and vehicle running resistance;

target acceleration setting means for setting a target acceleration;

acceleration comparison means for comparing the vehicle acceleration estimated by said vehicle acceleration estimation means, with the target acceleration, and speed change control means for controlling speed change by selecting, at the time of detecting a deceleration intention of the driver by said deceleration intention detection means, a speed change step to give a vehicle acceleration estimated by said vehicle acceleration estimation means to be equal to or above the target acceleration, based on the comparison results of said acceleration comparison means.

11. An apparatus for controlling the speed change of a vehicle automatic transmission according to claim 10, wherein said vehicle acceleration estimation means estimates a vehicle acceleration when the throttle valve is fully closed.

12. An apparatus for controlling the speed change of a vehicle automatic transmission according to claim 10, wherein said speed change control means controls speed change by selecting a speed change step on a lower speed side of the speed change steps which gives a vehicle acceleration estimated by said vehicle acceleration estimation means to be equal to or above the target acceleration.

13. An apparatus for controlling the speed change of a vehicle automatic transmission according to claim 10, wherein at the time of brake operation, speed change control by said speed change control means is not carried out.

14. An apparatus for controlling the speed change of a vehicle automatic transmission which is connected to an engine output shaft, said apparatus comprising:

vehicle speed detection means for detecting vehicle speed;

vehicle running resistance detection means for detecting vehicle running resistance;

engine load detection means for detecting engine load;

deceleration intention detection means for detecting a deceleration intention of a driver based on the engine load;

vehicle acceleration estimation means for estimating vehicle acceleration in the case of a speed change to a speed change step on a lower speed side of a current speed change step, based on the vehicle speed and vehicle running resistance;

target acceleration setting means for setting a target acceleration;

acceleration comparison means for comparing the vehicle acceleration estimated by said vehicle acceleration estimation means, with the target acceleration set by said target acceleration setting means;

speed change control means for controlling speed change by selecting, at the time of detecting a deceleration intention of the driver by said deceleration intention detection means, a speed change step to give a vehicle acceleration equal to or above the target acceleration, based on the comparison results of said acceleration comparison means;

vehicle acceleration detection means for detecting vehicle acceleration.

target acceleration setting means for setting a target acceleration;

acceleration comparison means for comparing the vehicle acceleration detected by said vehicle acceleration detection means, with the target acceleration set by said target acceleration setting means; and speed change control means for controlling speed change from a current speed change step to a higher speed change step, when a deceleration intention of the driver is detected by said deceleration intention detection means, and the comparison results of said acceleration comparison means, give the vehicle acceleration detected by said vehicle acceleration detection means as less than the target acceleration.

15. An apparatus for controlling the speed change of a vehicle automatic transmission which is connected to an engine output shaft, said apparatus comprising:

vehicle speed detection means for detecting vehicle speed, vehicle running resistance detection means for detecting vehicle running resistance;

engine load detection means for detecting engine load, deceleration intention detection means for detecting a deceleration intention of a driver based on the engine load;

vehicle acceleration estimation means for estimating the current speed change step and vehicle acceleration in the case based on the vehicle speed and vehicle running resistance;

target acceleration setting means for setting a target acceleration;

acceleration comparison means for comparing the vehicle acceleration estimated by said vehicle acceleration estimation means, with the target acceleration set by said target acceleration setting means; and speed change control means for controlling speed change by selecting, at the time of detecting a deceleration intention of the driver by said deceleration intention detection means, a speed change step to give a vehicle acceleration equal to or above the target acceleration, based on the comparison results of said acceleration comparison means.

* * * * *